United States Patent
Chilwal et al.

(10) Patent No.: US 10,769,329 B1
(45) Date of Patent: Sep. 8, 2020

(54) RETENTION MODEL WITH RTL-COMPATIBLE DEFAULT OPERATING MODE

(71) Applicant: Synopsys, Inc., Mountain View, CA (US)

(72) Inventors: Harsh Chilwal, San Jose, CA (US); Stephen T. Scherr, Geneva, FL (US); Todd M. Buzan, Milwaukie, OR (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/374,385

(22) Filed: Apr. 3, 2019

(51) Int. Cl.
*G06F 17/50* (2006.01)
*G06F 30/327* (2020.01)
(Continued)

(52) U.S. Cl.
CPC ............ *G06F 30/327* (2020.01); *G06F 30/33* (2020.01); *G06F 30/333* (2020.01); *G06F 30/34* (2020.01);
(Continued)

(58) Field of Classification Search
CPC ........ G06F 30/327; G06F 30/33; G06F 30/34; G06F 30/3223; G06F 30/333; G06F 30/398; G06F 2111/04; G06F 2111/20
(Continued)

(56) References Cited

U.S. PATENT DOCUMENTS 3,708,686 A * 1/1973 Butler, Jr. .............. G01R 23/10
307/149
4,212,076 A * 7/1980 Conners .............. G06F 9/30029
708/130
(Continued)

FOREIGN PATENT DOCUMENTS

JP        08018421 A  *  1/1996

OTHER PUBLICATIONS

Yang, Chinese Patent Document No. CN-205610599-U, published Sep. 28, 2016, 2 pages, abstract and 1 drawing. (Year: 2016).*
(Continued)

*Primary Examiner* — Phallaka Kik
(74) *Attorney, Agent, or Firm* — Bever, Hoffman & Harms, LLP

(57) ABSTRACT

A retention model includes a sequential block including two flip-flop/latch elements and a signal routing circuit having a network of alternative signal paths controlled by path control signals, which are generated by a retention controller block. The signal routing circuit enters a default operating mode when the signal path control signals are de-asserted, whereby the retention model implements a standard flip-flop/latch functionality in response to generic UPF signals applied to the model's generic input nodes, thereby facilitating RTL simulation of the retention model using a Verilog original always command. A selected retention strategy is implemented by modifying a retention controller block to assert a selected combination of path control signals, whereby the retention model may be implemented during UPF simulation using a map_retention_cell command. Restrictions prevent modification of the sequential block and path control signals and prevent use of generic input signals by the retention controller block.

17 Claims, 10 Drawing Sheets

(51) Int. Cl.
| | |
|---|---|
| *G06F 111/04* | (2020.01) |
| *G06F 111/20* | (2020.01) |
| *G06F 30/398* | (2020.01) |
| *G06F 30/33* | (2020.01) |
| *G06F 30/34* | (2020.01) |
| *G06F 30/333* | (2020.01) |

(52) U.S. Cl.
CPC ........ *G06F 30/398* (2020.01); *G06F 2111/04* (2020.01); *G06F 2111/20* (2020.01)

(58) Field of Classification Search
USPC ............................ 716/104, 106, 111; 703/15
See application file for complete search history.

(56) References Cited

U.S. PATENT DOCUMENTS

| | | | | |
|---|---|---|---|---|
| 4,635,186 A | * | 1/1987 | Oman ..................... | G06F 9/223 712/E9.005 |
| 5,404,461 A | * | 4/1995 | Olnowich ........... | G06F 13/4022 710/316 |
| 5,684,997 A | * | 11/1997 | Kau ........................ | G06F 13/24 710/260 |
| 5,710,911 A | * | 1/1998 | Walsh ....................... | G06F 1/10 713/322 |
| 5,729,720 A | * | 3/1998 | Kau .......................... | G06F 1/04 713/500 |
| 5,943,507 A | * | 8/1999 | Cornish .................. | G06F 13/24 710/260 |
| 9,020,797 B2 | | 4/2015 | Lin et al. | |
| 9,679,097 B2 | | 6/2017 | Srivastava | |
| 2003/0156652 A1 | * | 8/2003 | Wise ..................... | G06F 9/3867 375/240.26 |

OTHER PUBLICATIONS

Anusha, Renduchinthala, article entitled "An effective and efficient methodolgoy for SoC power management through UPF", Indraprastha Institute of Information Technology Delhi, Jun. 2016, 49 pages.

Bhargava, Madhur, et al., article entitled "Low-Power Verification Methodology using PF Query functions and Bind checkers", 2014 DVCON—Europe.

Biggs, John et al., IEEE Standards Association "Low-poer Design with the New IEEE 1801-2013 Standard" Workshop #4: presented by members of the IEE P1801 WF, Jun. 2, 2013.

Delp, Dr. Gary, LSI—A review of the IEEE P1801: Standard for the Design and Verification of Low Power Integrated Circuits DesignCon 2009 Low Power Workshop, Feb. 2009, 64 pages.

Sharafinejad, Reza et al., article entitled "UPF-based Forrmal Verification of Low Power Techniques in Modern Processors", 2015 IEEE 33rd VLSI Test Synposium, 978-1-4799-7597-6/15, 6 pages.

Srivastava, Amit et al., article entitled "Low Power SoC Verification: IP Reuse and Hierarchical Composition using UPF", DVCon : 131-II287, 2012.

* cited by examiner

RETENTION MODEL WITH RTL-COMPATIBLE DEFAULT OPERATING MODE

RELATED APPLICATION

This application claims priority from U.S. Provisional Patent Application 62/639,598, entitled "GENERIC RETENTION SUPPORT IN VCS AND FM", which was filed on Mar. 7, 2018, and is incorporated by reference herein.

BACKGROUND—DISCLAIMER

*In the following Background, Summary, and Detailed Description, headings should not be construed as necessarily limiting. In the following Background, Summary and Detailed Description, citation or identification of any publication does not signify relevance or status as prior art for any of the claimed or described embodiments. Paragraphs for which the text is all italicized signifies text that is common to multiple patent specifications filed by the assignee of this invention.*

BACKGROUND

Electronic Design Automation (EDA) tools are utilized throughout the (IC) development process (i.e., from an initial concept to a corresponding final layout design used to fabricate physical IC device or "chip"). The IC development process involves thoroughly testing (verifying) that a software-based circuit design satisfies a designers' constraints (e.g., functional/speed performance and power consumption requirements) before generating a physical IC device based on the circuit design. For example, most circuit designs undergo register transfer level (RTL) simulation and verification of the RTL behavior of the circuit design (e.g., which operations will be executed during which clock cycle and by which circuit elements). Most circuit designs also undergo testing to verify that the power intent of the circuit design complies with IEEE-1801 Unified Power Format (UPF) standards (e.g., by way of testing which power rails should be routed to individual blocks, when blocks are expected to be powered up or shut down, how voltage levels should be shifted as signals cross from one power domain to another, and whether measures should be taken to retain register and memory-cell contents if the primary power supply to a domain is removed). Once the circuit designers have verified that the RTL and UPF descriptions perform the desired logic functions and satisfy UPF standards, the circuit design is sometimes converted into a netlist using a logic synthesis tool, and then into the final layout design including the physical layout of the circuit elements and interconnect structures of the finalized circuit design. The final layout design is then converted into a series of masks that are sequentially utilized during a selected photolithographic fabrication process (e.g., CMOS) to produce IC devices on a substrate (e.g., a semiconductor wafer). Because modern IC devices can include tens of billions of transistors, the task of coordinating all modifications and tests required during a typical IC development process is too complicated to be performed without the aid of an EDA tools.

Logical equivalency checking (aka formal equivalence checking) is performed by specialized EDA tools during the IC development process to verify that different descriptions (i.e., versions or representations) of a circuit design exhibit exactly the same behavior. That is, the various testing/verification processes performed during the IC development process typically require a circuit design to be described (represented) using two or more different software languages, and it is critically important that these two or more descriptions exhibit exactly the same behavior (i.e., that a first description of a circuit design generated in one software language is functionally equivalent to a second description of the circuit design generated in another software language). For example, most circuit designs are initially generated as an RTL description using a hardware description language (HDL) such as Verilog or VHDL that facilitates the RTL simulation and verification process mentioned above. In contrast, UPF is based on the syntax and semantics of the Tool Command Language (Tcl) programming language, so it is necessary to generate a UPF description of the circuit design in Tcl to facilitate verification of compliance of the circuit design with the UPF standards. EDA tool providers typically provide compatible tools that perform the generation/conversion and testing of the RTL and UPF descriptions, and also typically provide logical equivalence checking tools capable of verifying the functional equivalency of the associated RTL and UPF descriptions. For example, Synopsys Incorporated of Mountain View, Calif. USA provides a VCS Tool suite that facilitates development and verification of Verilog-based RTL descriptions, a VCS-NLP tool that facilitates the generation and verification of TCL-based UPF descriptions, and the Formality® equivalency checking tool capable of verifying that a RTL description of a circuit design verified by VCS is functionally equivalent to a corresponding UPF description of the circuit design verified by VCS-NLP.

State retention cells (aka, retention registers) are utilized to facilitate low power consumption in most modern System-on-Chip-type (SoC-type) IC devices utilized in portable (battery power) devices. The circuitry of such SoC devices is typically segmented into multiple power domains, and each SoC device includes a power controller circuit that supplies full system power (e.g., VDD) to power domains (circuit portions) that are in use at a given time while "powering down" (i.e., supplying a minimum retention power source VRET) to power domains that are not in use. Most state retention cells include two sequential logic (i.e., flip-flop or latch) circuits often referred to as a storage element and a retention element. The storage element typically functions as a standard flip-flop or latch to receive and temporarily store data bits passed along an associated signal path to the state retention cell from upstream circuitry, and to transmit the sequence of temporarily stored data bits along the signal path to downstream circuitry. The retention element (sometimes referred to as a shadow latch) is typically configured to capture the last data bit stored by the retention element when the power domain containing the state retention cell is powered-down, to retain the last data bit during the subsequent power-down period (i.e., using the minimum retention power source), and to provide the data bit to the storage element and/or to a downstream circuit element when normal operation is resumed. With this arrangement, state retention cells facilitate low power operations, for example, by allowing a circuit portion to power down during idle periods of a processing sequence (e.g., while awaiting required data generated in another power domain), and to quickly resume the processing sequence when the circuit portion is subsequently powered up (e.g., when the awaited required data is available).

Like all physical circuit elements of an IC device, state retention cells are included into a circuit design during IC development by way of a corresponding software description (module) referred to herein as a "retention model". Each retention model typically includes an RTL description generated in an HDL that facilitates RTL verification, and includes a corresponding UPF description in Tcl that facilitates UPF verification.

The use of modified state retention cells in a circuit design currently causes extremely long RTL processing times due to incompatibilities between conventional RTL and UPF retention model descriptions, and due to constraints established by UPF standards. As mentioned above, state retention cells typically function like standard flip-flops at the RTL level, and function like substantially more complicated circuits at the UPF level. For example, a retention model may be initially defined in an RTL description using a Verilog always block command, such as:

always @(ASYNC_LOAD or DATA)
      if (ASYNC_LOAD)
         OUTPUT<=DATA;
   always @(posedge CLOCK)
      OUTPUT<=DATA
   process (CLOCK, ASYNC_LOAD, DATA)
      if (ASYNC_LOAD)
         OUTPUT<=DATA;
      elsif((CLOCK=1) and CLOCK'event)
         OUTPUT<=DATA;
      end if;

The above Verilog code may be graphically represented using the canonical RTL register 50 depicted in FIG. 11, and may be further defined as either a flip-flop or a latch using appropriate modifications to the Verilog code that are known in the art. Alternatively, IEEE 1801-UPF retention strategies specify which registered circuit states in a power domain should be retained with its primary power supply is removed using two main commands: set_retention and map_retention_cell, whereby a typical retention model utilized in a UPF description includes several additional signals such as those indicated by canonical UPF register 60 depicted in FIG. 12. Implementing map_retention_cell as defined in the IEEE-1801 standard poses the following problems, for which others have failed to provide a solution:

Performance and Capacity: Since the model as specified in the map_retention_cell is not type parameterized on UPF_GENERIC_DATA and UPF_GENERIC_OUTPUT, it can only be a single bit retention model. However, for an RTL simulation, scalarizing a bus results in event explosion leading to netlist like simulation performance for an RTL design. Instantiating the model for every retainable register bit will also contribute to several new instances in the design leading to memory blowup at runtime.

Flop/Latch Inferencing: Since UPF_GENERIC_DATA is one of the port maps needed in map_retention_cell, VCS-NLP will be required to implement flop/latch inferencing which can determine the DATA for every register. Today VCS-NLP does not use an inferencing engine. Instead it has a light weight template matching to determine Reset/Clock and Flop/Latch output. It does not infer DATA. Adding this capability will slow down the compile time.

Debug Challenge: The map_retention_cell approach instantiates the model specified in the command for every retainable register. It also requires not simulating the original always block which implements the register in RTL. This has an impact on DEBUG features like line stepping and break point as the original always block is never simulated.

Simulation Semantics Differences: Since original always block in the RTL may sometimes use delays, the simulation with original always block may not match the simulation with map_retention_cell specified model. This may not be a major problem for most designs.

What is needed is a retention model and associated methodology that avoid the delay and equivalence issues generated by conflicts between the RTL always block command and the UPF map_retention_cell command. In particular, what is needed is a retention model that minimizes RTL verification processing time while fully supporting a wide range of possible UPF strategies, and also facilitates efficient logical equivalence processing when the RTL and UPF descriptions are compared by an LEC tool.

BRIEF SUMMARY

The present invention is directed to a retention model that is partitioned into a sequential block and a retention controller block, where the sequential block is configured to implement a selected retention strategy when the retention controller block asserts one or more signal path control signals, and the sequential block is further configured to implement a standard flip-flop or latch when all of the signal path control signals are de-asserted. The sequential block includes two flip-flop/latch elements (i.e., a storage element and a retention element) and a signal routing circuit that is reconfigurable, by way of asserting corresponding combinations of the signal path control signals, to generate multiple alternative data, clock and set/reset signal paths between the two flip-flop/latch elements and generic input output nodes of the retention model. For example, one combination of asserted signal path control signals may be used to cause the retention element to store a last-received data bit from the storage element at power-down and to cause the storage element to store a retained data bit from the retention element at power-up. In accordance with an aspect of the present invention, the signal routing circuit is configured to enter a default operating mode when all of the signal path control signals are de-asserted (e.g., when operation of the retention controller block is disabled), whereby the retention model implements a standard flip-flop or latch function in response to generic signals applied to the model's generic input/output nodes. Specifically, when in the default operating mode, the signal routing circuit establishes a default signal path combination in which a first data signal path is formed between the input terminal of a storage element and a generic data input node of the retention model, a second data signal path is formed between the output terminal of the storage element and a generic data output node of the retention model, a clock signal path is formed between a clock terminal of the storage element and a generic clock node of the retention model, and a set/reset signal path is formed between a set/reset terminal of the storage element and a generic set/reset node of the retention model. When the default signal path combination is thus established by de-assertion of all signal path control signals, the data input terminal of the storage element is coupled to receive a UPF_GENERIC_DATA signal applied to the data input node, the clock terminal of the storage element is coupled to receive a UPF_GENERIC_CLK signal applied to the clock node, the set/reset terminal of the storage element is coupled to receive a UPF_GENERIC_ASYNC_LOAD signal applied to the set/reset node, and the data output terminal of the storage element is operably coupled to generate an UPF_GENERIC_OUTPUT signal on the model's data output node, whereby the sequential block is operably configured to simulate a flip-flop or latch in response to these generic signals. Accordingly, the present invention facilitates the use of the UPF map_retention_cell command by way of providing a signal routing circuit configured to implement multiple alternative retention strategies in response to associated combinations of asserted signal path control signals, thereby facilitating efficient processing of a UPF description of the circuit design by a UPF simulator. In addition, by configuring the sequential block to enter the default operating mode when all signal path control signals are de-asserted, the present invention greatly reduces the amount of processing time/cycles required to perform RTL verification because the retention model's RTL description can be entirely simulated using a Verilog original always block, thereby maximizing processing efficiency of an RTL simulator, and also utilizing the same retention model to perform logic equivalence checking involving RTL and UPF descriptions of a circuit design by facilitating separate RTL and UPF functionalities.

According to a preferred embodiment, reconfiguration of the retention model by a circuit designer (e.g., to implement the designer's selected retention strategy) is restricted (e.g., by way of corresponding binding System Verilog assertions and checkers) such that a UPF_GENERIC_DATA signal transmitted to the data input node of the retention model during simulation can only be received by the sequential block, and such that a UPF_GENERIC_OUTPUT signal transmitted from the data output node of the retention model during simulation can only be generated by the sequential block (i.e., the retention controller block cannot be reconfigured to either receive the UPF_GENERIC_DATA signal or to generate the UPF_GENERIC_OUTPUT signal in any operating mode). Restricting the use of the UPF_GENERIC_DATA and UPF_GENERIC_OUTPUT signals to the sequential block allows sharing of the retention controller block by multiple retention models in a given circuit design that receive the same UPF_GENERIC_CLOCK and UPF_GENERIC_ASYNC_LOAD signals, thus resulting in improved capacity and performance during UPF simulation. This restriction also simplifies the functionality of the sequential block such that the original always block in the RTL description that models the flip-flop (or latch) can be transformed to achieve the same functionality as the sequential block, whereby the UPF simulation tool (e.g., Synopsys' VCS-NLP) can use a transformation approach to model the sequential block behavior to improve correlation of UPF simulation results with non-UPF results.

According to another aspect of the preferred embodiment, reconfiguration of the retention model by a circuit designer is further restricted to modifications entered in the retention controller block by way of (second) restrictions that prevent modifications to the signal routing circuit of the sequential block, and by way of (third) restrictions that prevent modifications to the sequential-block/controller-block interface. As mentioned above, the signal routing circuit provides multiple alternative signal paths between the generic nodes and the storage and retention elements that are controlled by a fixed number of signal path control signals, and these signal path control signals are generated by the retention controller block, thereby establishing a sequential-block/controller-block interface between the retention controller block and the sequential block. In one embodiment, one or more signal path control signals of the sequential-block/controller-block interface is/are generated by a corresponding data-in signal generation circuit of the retention controller block and utilized to control a data-in path circuit of the signal routing circuit, where the data-in path circuit is configured to provide alternative signal paths between the storage element and either the generic input node or the retention element. According to the preferred embodiment, the restrictions mentioned above prevent a designer from modifying either the sequential-block/controller-block interface (e.g., by way of increasing or decreasing the number of data-in path control signals) or the data-in path circuit, but the retention model allows modification of the data-in signal generation circuit in the retention controller block. Similarly, the signal routing circuit includes a data-out path circuit configured to provide alternative signal paths between the storage element and the generic input node or the retention element, a clock path circuit configured to provide alternative signal paths between a clock input terminal of the storage element and the model's generic clock input node (i.e., which receives generic signal UPF_GENERIC_CLK) and a set/reset path circuit configured to provide alternative signal paths between a set/reset input terminal of the storage element and the model's generic set/reset input node (i.e., which receives generic set/reset signal UPF_GENERIC_ASYNC_LOAD), where each of these circuits is controlled by way of one or more associated control signals generated by a corresponding signal generation circuits of the retention controller block. In each case, restrictions prevent modification of the path control circuits in the signal routing circuit but allow modification of the corresponding signal generation circuits of the retention controller block. Note that limiting retention model modifications to the retention controller block establishes a well-defined interface between the sequential block and the retention controller block that does not change with modifications in the retention controller block. Restricting/preventing modifications to the sequential block improves processor efficiency during UPF simulation by way of pre-defining the sequential block in the UPF simulator, thereby allowing the pre-defined sequential block to be reused for every retention model included in a given circuit design, leaving only the retention controller block to be modeled for each type of retention cell.

In an exemplary embodiment, a retention model includes a modified signal routing circuit in which a data-out path circuit is configured to provide both the required "default" data-out signal path between the generic output node and the data output terminal of the storage element, and to provide additional signal paths from the data output terminal of either the storage element or the retention element to an optional (second) output node when associated signal path control signals are asserted. This optional data-out path circuit may be used, for example to facilitate the implementation of retention model in either a balloon-style retention strategy or a master/slave-alive retention strategy.

This Summary does not attempt to provide the complete significance of any particular innovation, embodiment, or example as it can be used in commerce. Additionally, this Summary is not intended to signify key or critical elements of an innovation, embodiment or example or to limit the scope of the subject matter of this disclosure. The innovations, embodiments, and/or examples found within this disclosure are not all-inclusive, but rather describe the basic significance of the subject matter. Accordingly, one use of this Summary is as a prelude to a Detailed Description presented below.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The Figures and the following Detailed Description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The Figures and Detailed Description may also signify, implicitly or explicitly, advantages and improvements of a subset of the exemplary embodiments described herein.

In the Figures and Detailed Description, numerous specific details may be described to provide a thorough understanding of one or more of the exemplary innovations, embodiments and/or examples. In the interest of not obscuring the presentation of the exemplary innovations, embodiments and/or examples in the following Detailed Description, some processing steps or operations that are known in the art may have been combined together for presentation and for illustration purposes and might not be described in detail. However, a person skilled in the art will recognize that these exemplary innovations, embodiments and/or examples may be used in commerce without these specific details or with equivalents thereof. In other instances, well-known processes and devices are not described in detail as not to unnecessarily obscure aspects of these exemplary innovations, embodiments and/or examples. In other instances, some processing steps or operations that are known in the art may not be described at all. The following description is instead focused on the distinctive features or elements of various exemplary innovations, embodiments and/or examples. Furthermore, while this description may refer to some components of the structure in the singular tense, more than one component may be depicted throughout the Figures and like components are labeled with like numerals.

Figure 1:
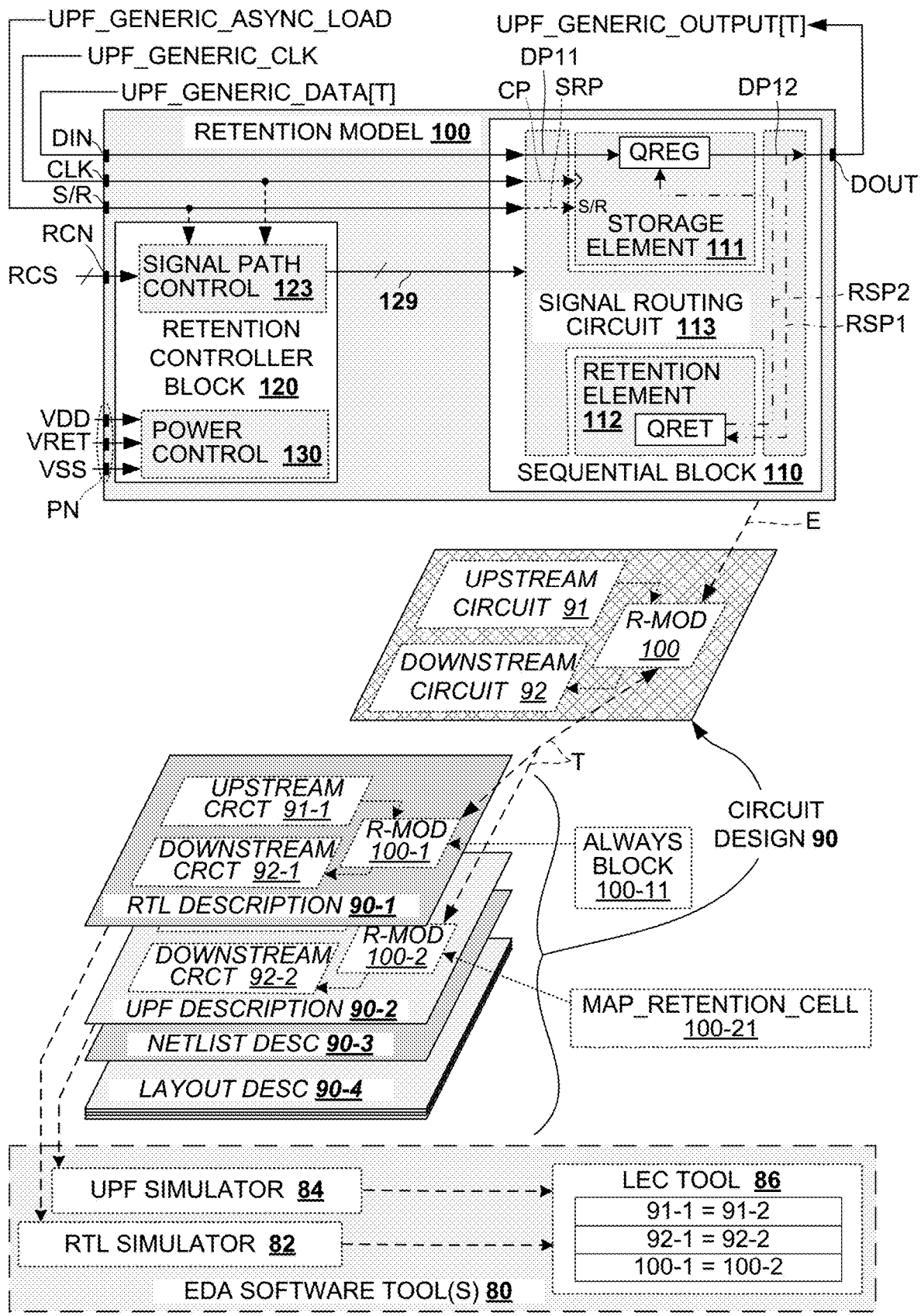
FIG. 1 is a diagram depicting a method for developing a circuit design including retention models of the present invention.

FIG. 1 is a simplified diagram depicting a computer-implemented method for incorporating a state retention cell into a circuit design 90 by way of instantiating a retention model 100 according to an embodiment of the present invention. Retention model 100 is show in generalized detail in the upper portion of FIG. 1, which is described below, and is configured (i.e., defined by way of associated software descriptions generated in accordance with known techniques) to model multiple different state retention cells. As indicated by dashed arrow E, instantiation of retention model 100 into circuit design 90 is typically achieved when a circuit designer designates the insertion of retention model 100 such that data signals transmitted along a selected signal path from a design-specific upstream circuit 91 to retention model 100, and from retention model 100 to a design-specific downstream circuit 92.

As explained in additional detail below, retention model 100 is generally characterized by including configurable circuitry that selectively implements one of several possible retention strategies, where implementation of a selected retention strategy is achieved by way of modifying specific portions of the configurable circuitry. In one embodiment, a circuit designer's modifications to retention model 100 (i.e., such that retention cell 100 implements the designer's selected retention strategy) are entered before retention cell 100 is instantiated in circuit design 90. In alternative embodiments, retention model 100 may be modified after instantiation into circuit design 90, or modified both before and after instantiation (e.g., initially modified before instantiation, and then correctively modified after instantiation). In either case, the modified version of retention model 100 retains certain non-modifiable circuit features (described below) that are also present in retention model 100 when in a non-modified state.

As indicated by arrow T, circuit design 90 is typically modified and verified using alternative versions/descriptions including an RTL description 90-1 and a UPF description 90-2. As described above, RTL description 90-1 and UPF description 90-2 are typically composed using two different software languages (e.g., Verilog and Tcl), and therefore respectively include an RTL retention model version 100-1 and a UPF retention model version 100-2 operably coupled to RTL/UPF versions of upstream circuit 91 (i.e., RTL version 91-1 and UPF version 91-2) and downstream circuit 92 (i.e., RTL version 92-1 and UPF version 92-2). Additional versions of circuit design 90, such as an optional netlist description 90-3 and a layout description 90-4 including a series of mask/reticle descriptions, are also shown for completeness. As indicated at the lower portion of FIG. 1, an EDA software tool 80 (or suite of associated tools) includes an RTL simulator 82 configured to simulate and verify RTL description 90-1, a UPF simulator 84 configured to simulate and UPF description 90-2, and a logical equivalence checking (LEC) tool 86, which is configured to determine the functional equivalency of associated RTL description 90-1 and UPF description 90-2. Referring to the lower portion of FIG. 1, also shows subsequent simulation and logical equivalency checking of RTL and UPF descriptions of circuit design 90 that are performed prior to fabrication of IC devices (chips) based on a finalized version of circuit design 90.

Referring again to the upper portion of FIG. 1, retention model 100 includes four generic (standard) input/output nodes, three power nodes PN, and one or more retention control nodes RCN that receive associated signals during simulation of circuit design 90. The generic input/output nodes include a data input node DIN configured to receive a generic input signal UPF_GENERIC_DATA from upstream circuitry 91, a clock node CLK configured to receive a generic clock signal UPF_GENERIC_CLK, a set/reset node S/R configured to receive a generic set/reset signal UPF_GENERIC_ASYNC_LOAD, and a data output node DOUT configured to pass a generic output signal UPF_GENERIC_OUTPUT to downstream circuitry 92. Power nodes PN are configured to receive system power VDD, system ground VSS and a retention power supply VRET. Retention control nodes RCN receive externally supplied retention control signals RCS, which are utilized as described below. In one embodiment, retention model 100 is implemented in circuit design 90 by way of one or more Verilog always block commands 110-11 (i.e., either an always_ff command or an always_latch command), which is entered by way of RTL description 90-1, and by one or more UPF map_retention_cell commands 100-21, which entered by way of UPF description 90-2. In one embodiment generic input/output nodes DIN, DOUT, CLK and S/R are restricted (non-modifiable) features of retention model 100, but circuit design 100 may be modified to include additional power nodes PN and any number of retention control nodes RCN.

According to an aspect of the present invention, retention model 100 is effectively partitioned into two sub-circuit portions (blocks): a sequential block 110 having a fixed (non-modifiable) circuit configuration, and a retention controller block 120 having an associated configuration that may be modified by a circuit designer. Sequential block 110 functions to receive/transmit generic signals UPF_GENERIC_DATA and UPF_GENERIC_OUTPUT in accordance with a retention strategy that is implemented in response to the assertion of one or more signal path control signals 129. Sequential block 110 includes a storage element 111 configured to store a regular (first) data value QREG, a retention element 112 configured to store a retention (second) data value QRET, and a signal routing circuit 113 operably coupled to storage element 111, retention element 112 and the generic input/output nodes of retention model 100. In a presently preferred embodiment, retention model 100 is provided in two variants including a flip-flop variant in which storage element 111 and retention element 112 comprise standard flip-flop circuit descriptions, and a latch variant in which storage element 111 and retention element 112 comprise standard latch circuit descriptions—for brevity the description of retention model 100 provided below purposefully omits further mention of these two different configurations because differences between these two configurations are understood and easily implemented by those skilled in the art. As explained by way of the examples provided below, signal routing circuit 113 provides a series of alternative signal paths that selectively couple the generic input/output nodes to the two flip-flop/latch elements (i.e., a storage element 111 and a retention element 112) by gates and other circuit elements, wherein each signal path is controlled by one or more corresponding signal path control signals 129. Retention controller block 120 includes a signal path control circuit 123 that functions to generate signal path control signals 129 in response to externally supplied retention control signals RCS. In one embodiment, retention controller block 120 also includes a power control circuit 130 that is configured to receive power supplies VDD, VRET and VSS, and to distribute these power supplies to signal control path 123 and sequential block 110 in accordance with the implemented retention strategy. Because the present invention primarily pertains to the distribution of generic and control signals, and because the associated distribution of power signals is understood by those skilled in the art, further discussion of power supply distribution is omitted below for brevity.

According to an aspect of the present invention, sequential block 110 is configured to implement a designer's selected retention strategy when retention controller block 120 asserts one or more signal path control signals 129, and sequential block 110 is further configured to implement a standard flip-flop/latch when all of signal path control signals 129 are de-asserted. That is, asserting one or more signal path control signals 129 causes signal routing circuit 113 to establish a signal path that implements a selected retention strategy. For example, signal routing circuit 113 may be controlled to establish a signal path RSP1 by asserting a first combination of signal path control signals 129 to facilitate the transmission of a last-received data bit QREG from storage element 111 to retention element 112 for storage as retention data bit QRET during a power-down period. Alternatively, signal routing circuit 113 may be controlled to establish a signal path RSP2 by asserting a second combination of signal path control signals 129 to facilitate the transmission of retained data bit QRET from retention element 112 to storage element 111 at the beginning of a subsequent power-up event. According to the aspect mentioned above, the configuration of signal routing circuit 113 is defined such that de-asserting all signal path control signals 129 produces a default operating mode in which retention model 100 implements a standard flip-flop or latch function in response to the generic input signals applied to generic input nodes DIN, CLK and S/R, where output data signals from the flip-flop/latch are applied to generic output node DOUT. Specifically, when all signal path control signals 129 are in a de-asserted state (i.e., a low or high state generated when retention controller block 120 is effectively powered-down or otherwise non-functional), signal routing circuit 113 establishes a default signal path combination including a (first) data signal path DP11 between an input terminal of storage element 111 and generic data input node DIN, a (second) data signal path DP12 between the output terminal of storage element 111 and generic data output node DOUT, a clock signal path CP1 between a clock terminal of storage element 111 and generic clock node CLK, and a set/reset signal path SRP between a set/reset terminal S/R of storage element 111 and generic set/reset node S/R. When this default signal path combination is established and the generic input signals are operably applied to the generic input nodes of retention model 100, generic input signal UPF_GENERIC_DATA is passed to data input terminal IN of storage element 111 by way of data signal path DP11, the clock terminal of storage element 111 is coupled to receive generic clock signal UPF_GENERIC_CLK by way of clock signal path CP1, the set/reset S/R terminal of the storage element 111 is coupled to receive generic set/reset signal UPF_GENERIC_ASYNC_LOAD signal by way of signal path SRP, and the data output terminal OUT of the storage element 111 is operably configured to output (transmit) UPF_GENERIC_OUTPUT signal by way of signal path DP12, whereby sequential block 110 is operably configured to simulate a flip-flop or latch during simulation of circuit design 90.

In one embodiment, when RTL-based circuit design 90-1 is simulated by RTL simulator 82, RTL operations of retention model 100-1 are entirely simulated using the Verilog original always block command 100-11, and when the UPF-based circuit design 90-2 is simulated by UPF simulator 84, UPF operations of retention model 100-2 are entirely simulated using map_retention_cell command 100-21.

Figure 2:
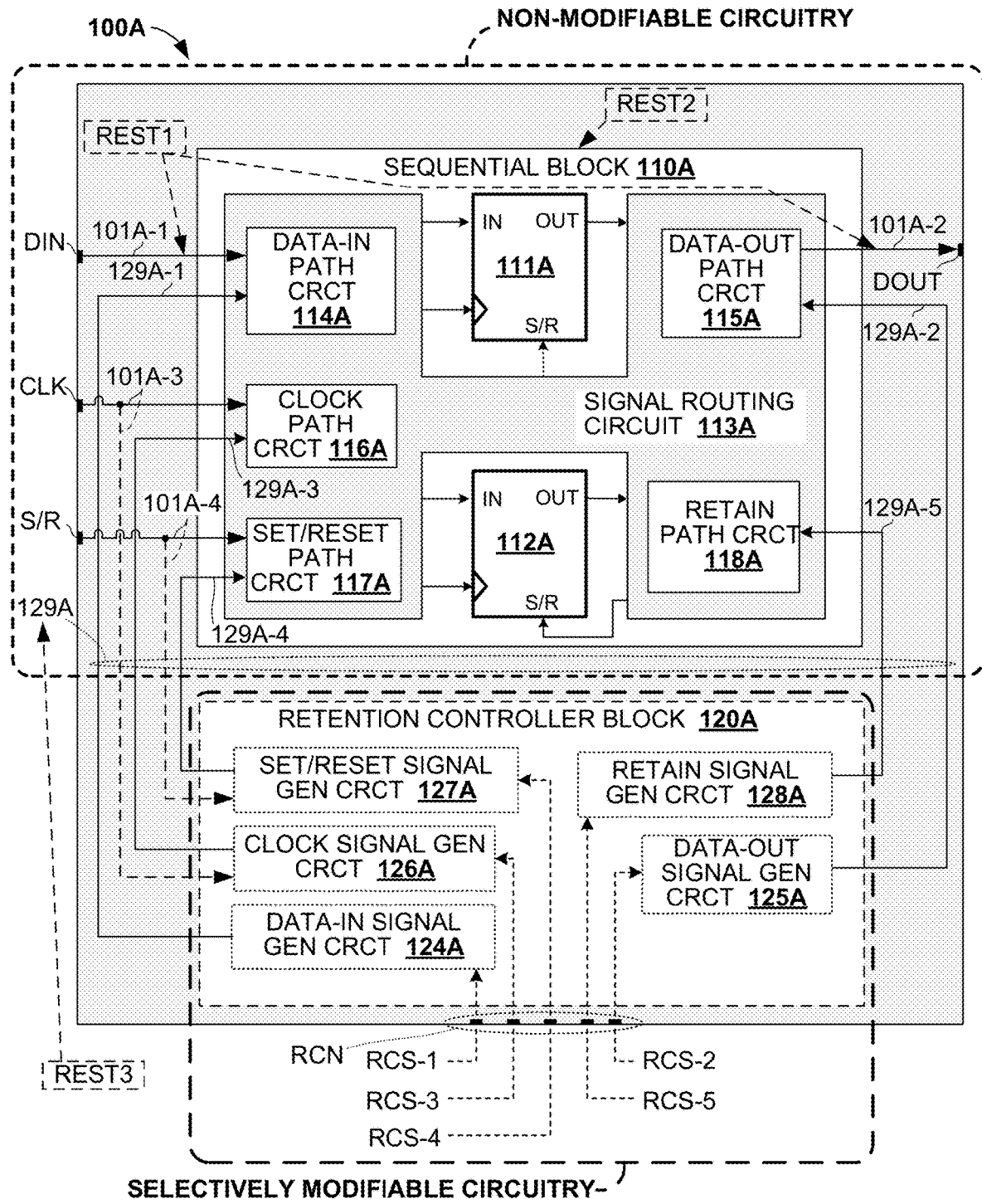
FIG. 2 is a block diagram depicting a retention model according to an exemplary embodiment of the present invention.
Figure 3:
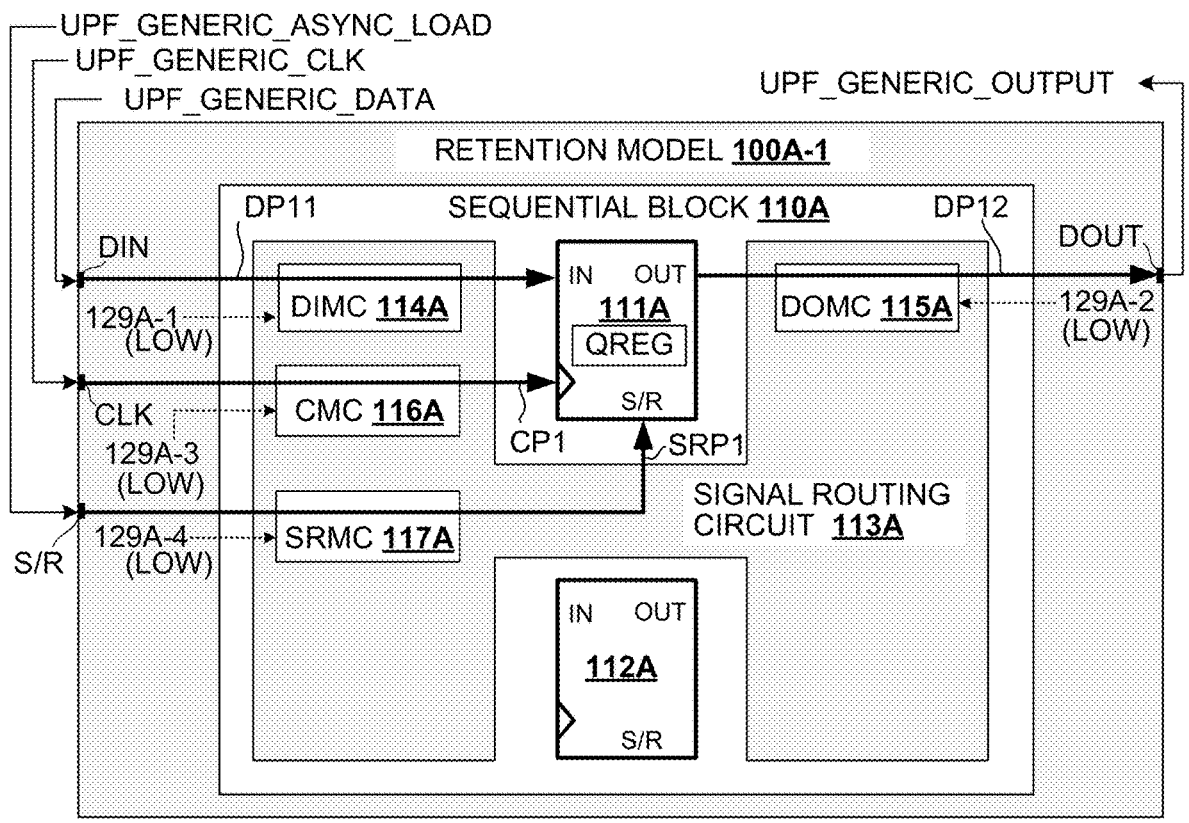
FIG. 3 is a block diagram depicting a sequential block of the retention model of FIG. 2 during RTL simulation.
Figure 4A:
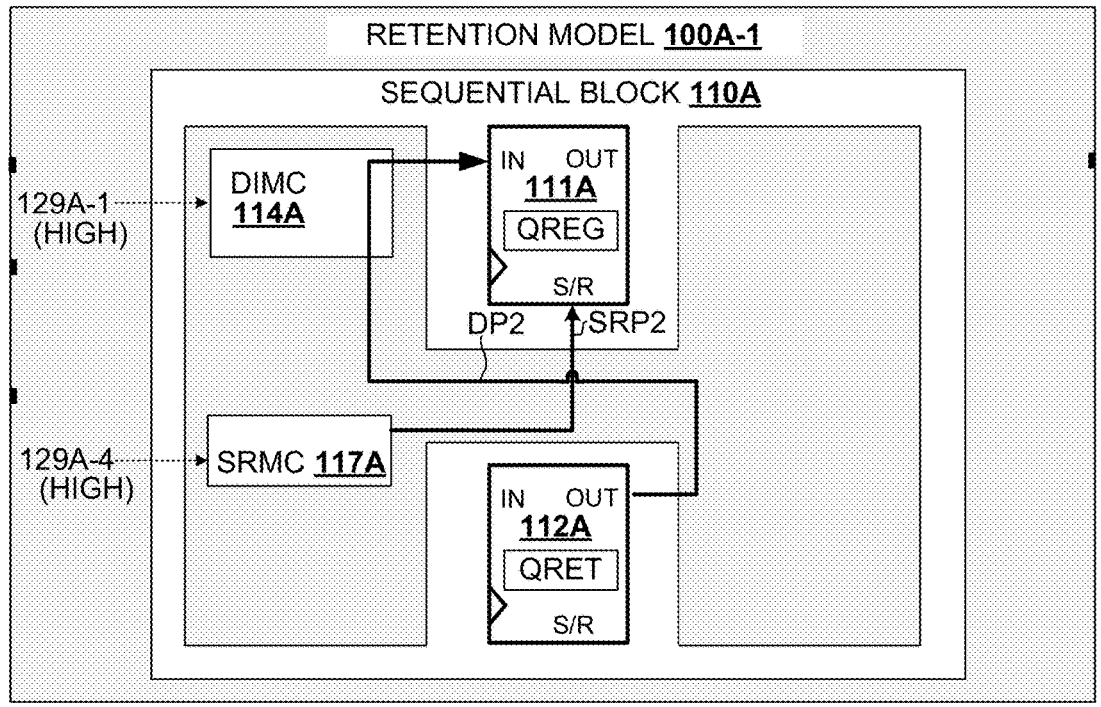
FIGS. 4A and 4B are block diagrams depicting the sequential block of the retention model of FIG. 2 during exemplary UPF simulation.
Figure 4B:
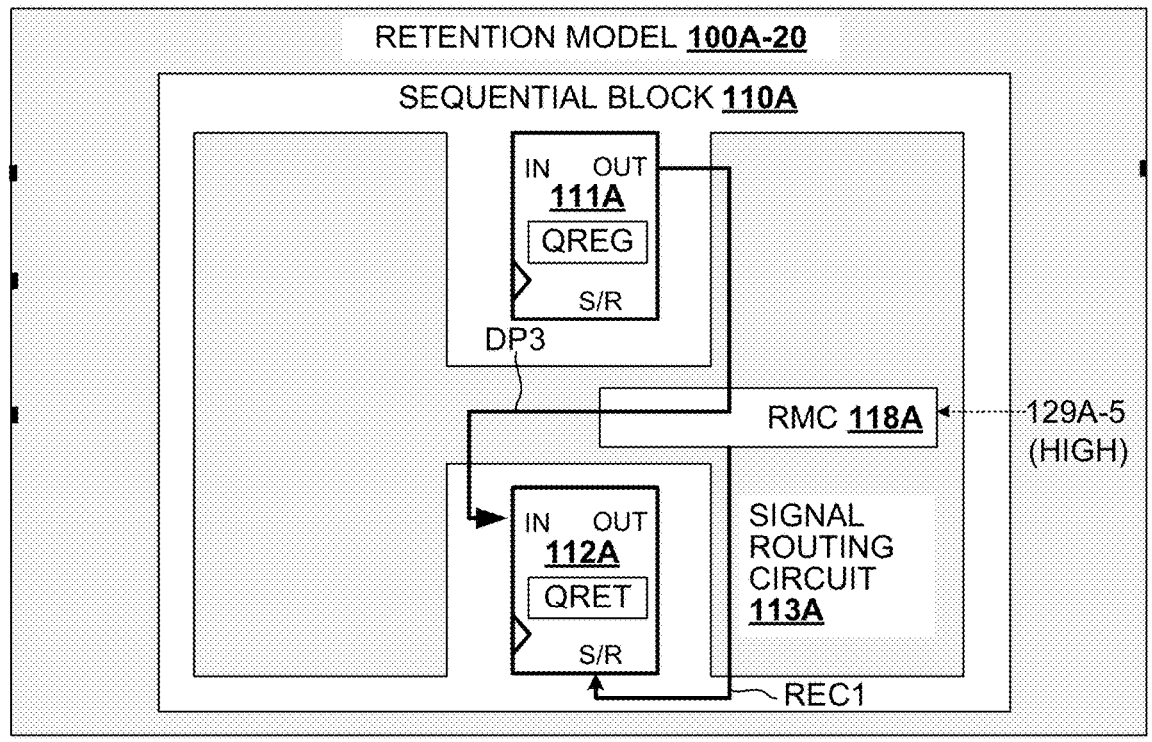

FIG. 2 is a block diagram showing a retention model 100A according to an exemplary embodiment, and FIGS. 3, 4A and 4B depict exemplary signal path configurations implemented by retention model 110A in a default operating mode and alternative non-default operating modes.

Referring to FIG. 2, retention model 100A includes a sequential block 110A and a retention controller block 120A, where sequential block 110A includes a storage element 111A, a retention element 112A and a signal routing circuit 113A that establishes selected signal paths in response to signal path control signals 129A-1 to 129A-5 generated by corresponding portions of retention controller block 120A. In this case, the alternative signal paths provided by signal routing circuit 113A are separated into signal path circuit sections that are controlled by corresponding signal path control signals, which in turn are generated by corresponding signal generation circuit portions of retention controller block 120A. Specifically, a data-in path circuit 114A of signal routing circuit 113A is controlled by a signal path control signal 129A-1, which is generated by a data-in signal generation circuit 124A in response to external control signal RCS-1 supplied to retention controller block 120A. Similarly, a data-out path circuit 115A is controlled by a signal path control signal 129A-2 generated by a data-out signal generation circuit 125A in response to external control signal RCS-2, a clock path circuit 116A is controlled by a signal path control signal 129A-3 generated by clock signal generation circuit 126A in response to external control signal RCS-3, a set/reset path circuit 117A is controlled by a signal path control signal 129A-4 generated by set/reset signal generation circuit 127A in response to external control signal RCS-4, and a retention path circuit 118A is controlled by a signal path control signal 129A-5 generated by retention signal generation circuit 128A in response to external control signal RCS-5.

Consistent with the generalized embodiment described above, signal routing circuit 113A is configured to enter a default operating mode (i.e., such that sequential block 110A implements a standard flip-flop) when all signal path control signals 129A-1 to 129A-5 are de-asserted (e.g., low), and such that sequential block 110A implements a selected retention strategy while one or more of the signal path control signals 129A-1 to 129A-5 is asserted (e.g., high). For example, data-in path circuit 114A includes circuitry and conductive lines that operably form signal path DP11 (shown in FIG. 3) between data input node DIN and data input terminal IN of storage element 111A when all of one or more corresponding signal path control signals 129A-1 is de-asserted, and form one or more alternative signal paths (e.g., signal path DP2, shown in FIG. 4A, between output terminal OUT of retention element 112A and input terminal IN of storage element 111A) when one or more of corresponding signal path control signals 129A-1 is asserted. Similarly, data-out path circuit 115A includes circuitry and conductive lines that operably form signal path DP12 (shown in FIG. 3) between data output node DOUT and data output terminal OUT of storage element 111A when all signal path control signals 129A-2 are de-asserted, and may form an alternative signal path when one or more of corresponding signal path control signals 129A-1 is asserted. Clock path circuit 115A operably forms signal path CP1 (shown in FIG. 3) between clock input node CLK and clock input terminal ">" of storage element 111A when all signal path control signals 129A-3 are de-asserted, and may form an alternative signal path when one or more of corresponding signal path control signals 129A-3 is asserted. Set/reset path circuit 117A operably forms signal path SRP1 (shown in FIG. 3) between set/reset input node S/R and set/reset terminal S/R of storage element 111A when all signal path control signals 129A-4 are de-asserted, and may form an alternative signal path (e.g., signal path SRP2, shown in FIG. 4A) when one or more of corresponding signal path control signals 129A-4 is asserted. Finally, retention path circuit 118A does not affect the default operating mode configuration when all signal path control signals 129A-5 are de-asserted, but may form an alternative signal path (e.g., signal path DP3, shown in FIG. 4B) when one or more of corresponding signal path control signals 129A-5 is asserted.

According to a preferred embodiment, retention model 100A includes one or more restrictions (e.g., binding System Verilog assertions and checkers) that prevent reconfiguration (modification) of key portions of retention model 100A by a circuit designer when incorporated into a circuit design. In a specific embodiment, as indicated by the dashed line block surrounding the upper half of FIG. 2, retention model 100A includes one or more restrictions that restrict input data path 101A-1, signal routing circuit 113A and sequential-block/controller-block interface 129A formed by signal path control signals 129A-1 to 129A-5 comprise "non-modifiable" circuitry protected by suitable restrictions that prevent modification by a circuit designer. Conversely, as indicated by the dashed line block surrounding the lower half of FIG. 2, retention controller block 120A and comprise "selectively modifiable" circuitry that can be modified by a designer to implement a desired retention strategy, but all modifications to retention controller block 120A must comply with the restrictions applied to input data path 101A-1, signal routing circuit 113A and sequential-block/controller-block interface 129A.

Referring to the upper-left portion of FIG. 2, in one embodiment retention model 100A includes one or more input (first) restrictions REST1 that require generic input data signals UPF_GENERIC_DATA, which are received at data input node DIN of retention model 100A during simulation, to only be passed to sequential block 110A, and require that generic output data signals UPF_GENERIC_OUTPUT transmitted from data output node DOUT of retention model 100A during simulation to only be generated by sequential block 110A. That is, restrictions REST1 are included in retention model 100A (or otherwise associated with the standard cell description associated with retention model 100A) and configured to prevent a designer from modifying retention model 100A such that retention controller block 120A is operably coupled to either receive generic input data signal UPF_GENERIC_DATA signal from data input node DIN or transmit a generic output data signal UPF_GENERIC_OUTPUT signal through data output node DOUT in any operating mode.

Figure 5:
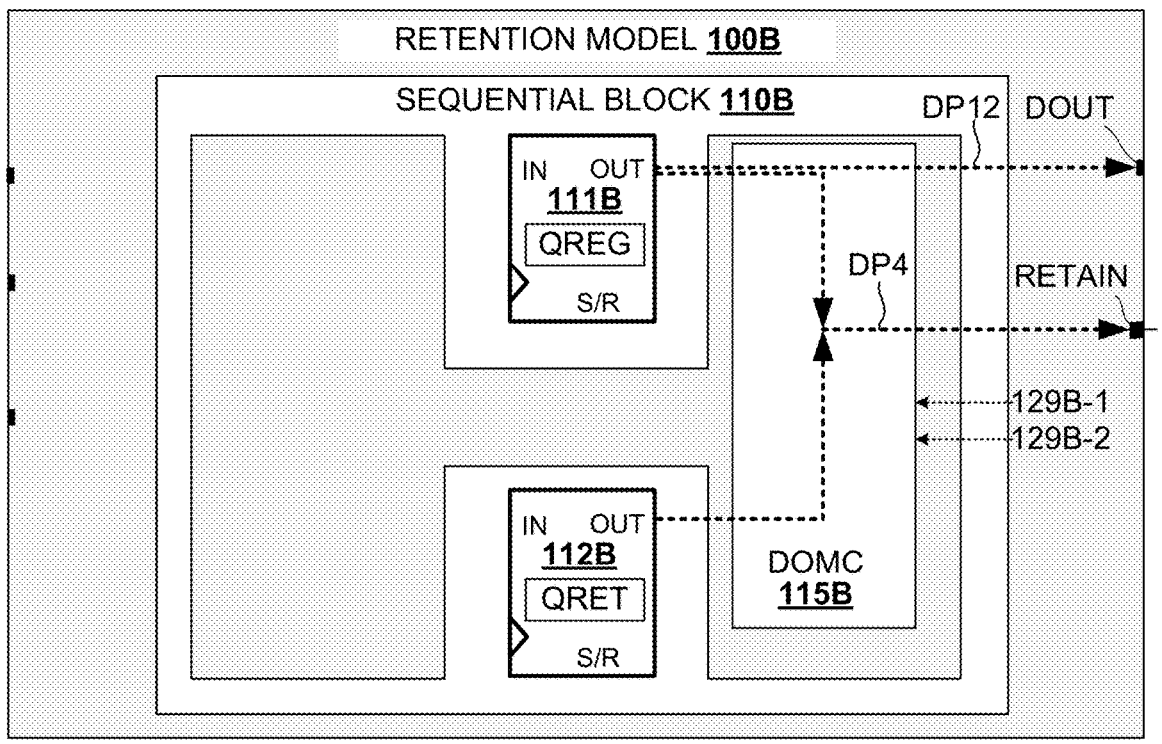
FIG. 5 is a block diagram depicting a sequential block of a retention model configured in accordance with another exemplary embodiment of the present invention.

Although the sequential block of a retention model cannot be modified by a circuit designer, the sequential block configuration is not limited to the embodiments described herein. For example, FIG. 5 depicts a partial retention model 100B in which sequential block 110B is configured to implement both balloon-style and master/slave-alive retention strategies by way of including a signal routing circuit 113B having a data-out path circuit 115B that facilitates the transmission of data signals to an alternative (second) output node RETAIN. That is, data-out path circuit 115B is similar to the previously described embodiments in that it generates default output data signal path DP12 from output terminal OUT of storage element 111B to data output terminal OUT when signal path control signals 129B-1 and 129B-2 are de-asserted. However, data-out path circuit 115B differs from previous embodiments in that it also provides a signal path DP4 between data output terminal OUT of either storage element 111B or retention element 112B and alternative output node RETAIN when one or both of signal path control signals 129B-1 and/or 129B-2 is/are asserted. This configuration facilitates utilizing a master/slave-alive retention strategy by way of instantiating two associated retention models 110B into a circuit design, with the retention controller circuit of the first retention model configured such that sequential block 110B of the first retention model 110B implements the functionality of a master cell, and such that the retention controller circuit of the second retention model 110B is configured such that sequential block 110B implements the functionality of a corresponding slave cell. In another alternative embodiment, data-out path circuit 115B may be configured such that a first signal path between data output terminal OUT of storage element 111B and alternative output node RETAIN is formed when signal path control signal 129B-1 is asserted and signal path control signal 129B-2 is de-asserted, and second signal path between data output terminal OUT of retention element 112B and alternative output node RETAIN is formed when signal path control signal 129B-1 is de-asserted and signal path control signal 129B-2 is asserted, thereby supporting additional retention strategy options.

Figure 6A:
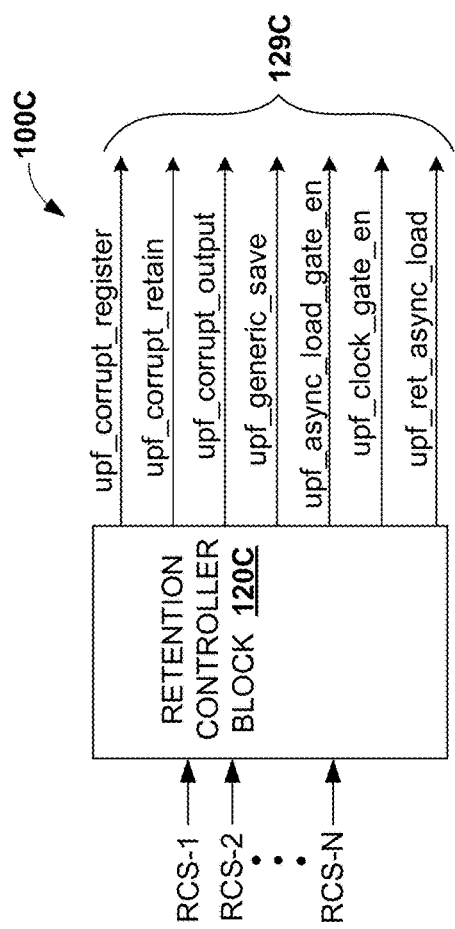
FIGS. 6A and 6B are block diagrams depicting a retention controller block and a sequential block, respectively, of a retention model configured in accordance with another exemplary embodiment of the present invention.
Figure 6B:
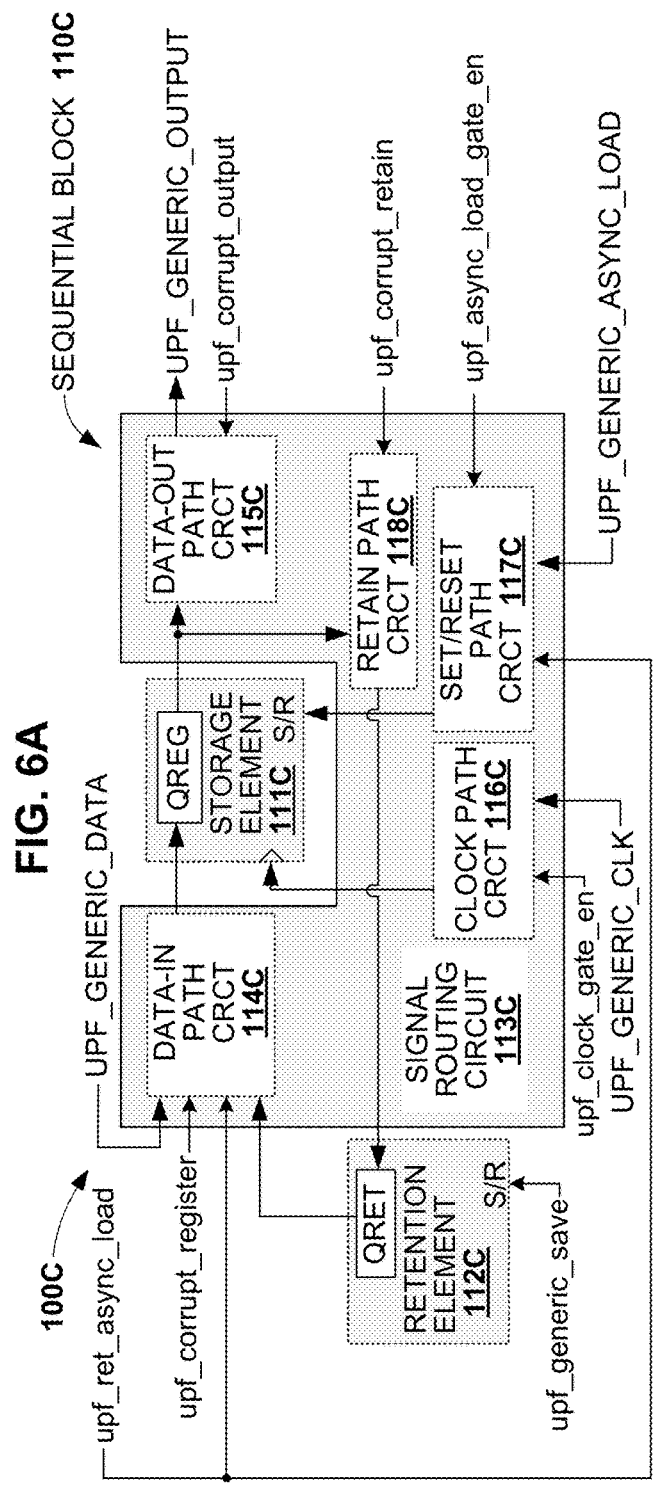

FIGS. 6A and 6B respectively depict a retention controller block 120C and a sequential block 110C of a retention model 100C according to another exemplary embodiment. As set forth above, retention model 100C In this case, retention controller block 120C is configured to receive retention control signals RCS-1 to RCS-N, and to generate seven signal path control signals (and optional attributes, not shown) that collectively define an interface 129C, where these signals/attributes are transmitted by way of conductive paths and applied to corresponding path circuits of sequential block 110C as described below. Control signal upf_corrupt_register of interface 129C is transmitted to data-in path circuit 114C, and is utilized to trigger corruption on storage element 111C when asserted. Control signal upf_corrupt_retain is transmitted to retain path circuit 118C, and is utilized to trigger corruption on retention element 112C when asserted, or to trigger corruption on storage element 111C if retention element 112 is not needed. Control signal upf_corrupt_output is transmitted to data-out path circuit 115C, and is utilized to trigger corruption on the data-out path when asserted. Control signal upf_generic_save is transmitted to the set/reset terminal of retention element 112C and is used to save a data value QREG output from storage element 111C as retained data value QRET in retention element 112C. Control signal upf_async_load_gate_en is transmitted to set/reset path circuit 117C and utilized to control the transmission of generic set/reset signal UPF_GENERIC_ASYNC_LOAD to the set/reset terminal S/R of storage element 111C. Control signal upf_clock_gate_en is transmitted to clock path circuit 116C and utilized to control the transmission of generic clock signal UPF_GENERIC_CLK to the clock input terminal of storage element 111C. Finally, signal routing circuit 113C is configured such that control signal upf_ret_async_load is transmitted to data-in path circuit 114C and set/reset path circuit 117C, and is utilized to restore retained data value QRET from retention element 112C to storage element 111C. Note that control signal upf_ret_async_load is an example of a control signal utilized by two or more path control circuits of signal routing circuit 113C in a manner that generates (e.g., in combination with the assertion of one or more of control signals upf_corrupt_register and upf_async_load_gate_en) two alternate signal path combinations during UPF simulation. In addition to the above-mentioned control signals, several attribute signals may be utilized to control the operations of the various circuit structures. For example, an attribute upf_retention_sequential_block may be utilized to identify sequential block 110C, an attribute upf_generic_output may be utilized to identify data output from sequential block 110C, an attribute upf_generic_data may be utilized to identify data input to sequential block 110C, an attribute upf_generic_retain may be utilized to identify a retained value output from sequential block 110C. In one embodiment, modifications to interface 129C are restricted so that the UPF simulator (e.g., VCS-NLP) and the LEC tool are able to identify the control signals and attributes used to control sequential block 110C.

Figure 7:
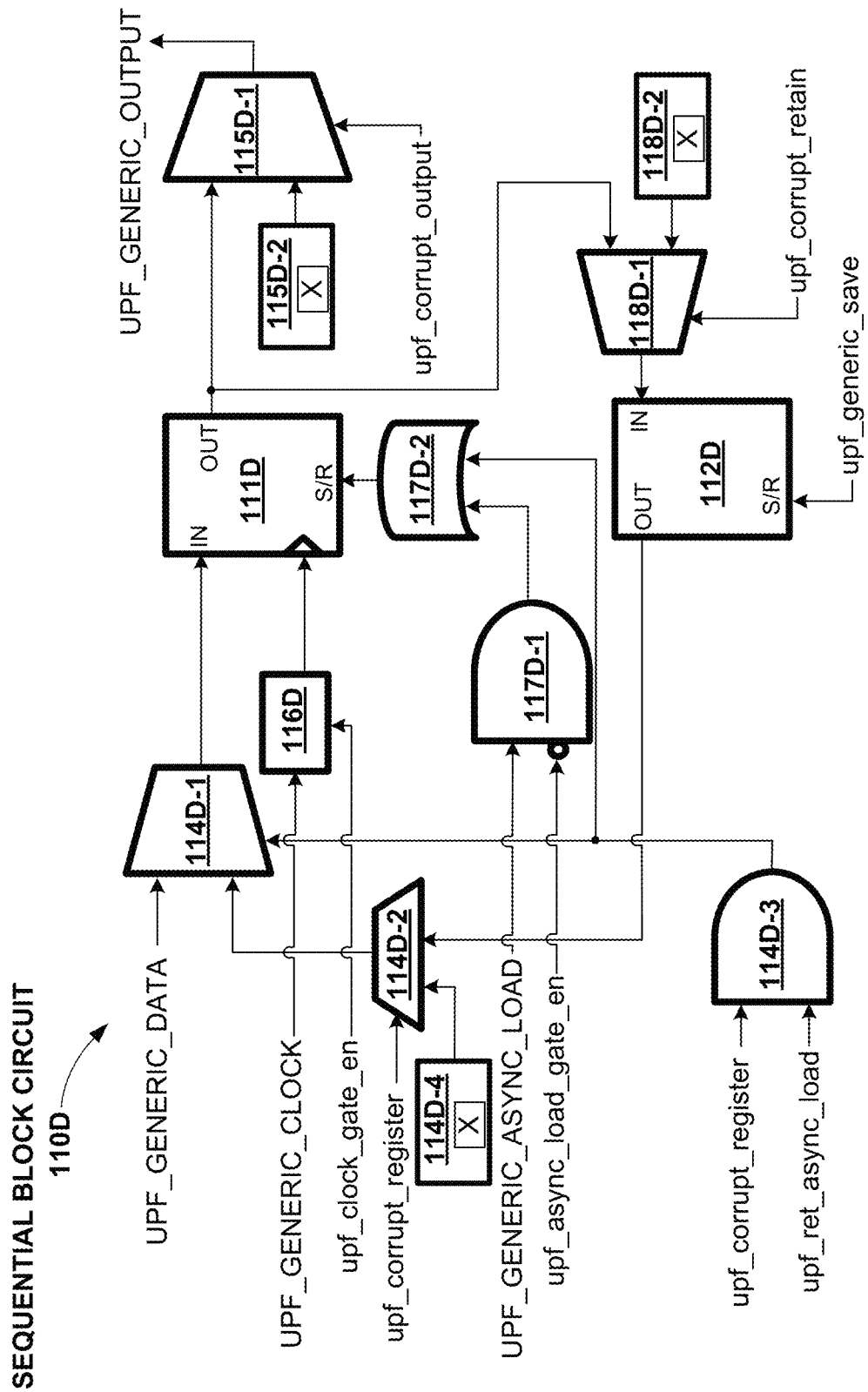
FIG. 7 is a block diagram depicting a sequential block of a retention model configured in accordance with a specific exemplary embodiment of the present invention.

FIG. 7 is a simplified circuit diagram depicting a sequential block 110D including an exemplary set of circuit elements (e.g., gate circuits and logic elements) that are operably configured to implement the path circuits 114C to 118C of sequential block 110C in response to the specific control signals described above with reference to FIG. 6A. For example, data-in path circuit 114C of sequential block 110C (FIG. 6A) is effectively implemented in sequential block 110D (FIG. 7) by a first multiplexer 114D-1, a second multiplexer 114D-2, a logic AND gate 114D-3 and a non-volatile memory cell 114D-4, where the input terminals of multiplexer 114D-1 are respectively coupled to an output terminal of multiplexer 114D-2 and to receive generic data signal UPF_GENERIC_DATA and a control terminal of multiplexer 114D-1 is coupled to an output terminal of logic AND gate 114D-3, the input terminals of multiplexer 114D-2 are respectively coupled to memory cell 114D-3 and to the output terminal OUT of retention element 112D and a control terminal of multiplexer 114D-2 is coupled to receive control signal upf_corrupt_register, and the input terminals of logic AND gate 114D-3 are coupled to receive control signals upf_corrupt_register and upf_ret_async_load. In addition, data-out path circuit 115C of sequential block 110C is effectively implemented in sequential block 110D by a third multiplexer 115D-1 having input terminals respectively coupled to the output terminal OUT of storage element 111D and to a non-volatile memory cell 115D-2, and having a control terminal coupled to receive control signal upf_corrupt_output. Also, clock path circuit 116C (FIG. 6B) is effectively implemented by a clock gater 116D having an input terminal coupled to receive generic clock signal UPF_GENERIC_CLOCK, an output terminal connected to the clock terminal of storage element 111D, and a control terminal connected to receive control signal upf_clock_gate_en. Further, set/reset path circuit 117C (FIG. 6B) is effectively implemented by a logic AND gate 117D-1 and a logic OR gate 117D-2, where the input terminals of logic AND gate are coupled to receive generic set/reset signal UPF_GENERIC_ASYNC_LOAD and an inverted form of control signal upf_async_load_gate_en, and the input terminals of logic OR gate 117D-2 are respectively connected to the output terminal of logic AND gate 117D-1 and the output terminal of logic AND gate 114D-3. Finally, retention path circuit 118C (FIG. 6B) is effectively implemented by a fourth multiplexer 118D-1 and a non-volatile memory cell 118D-2, where the input terminals of multiplexer 118D-1 are respectively coupled to memory cell 118D-2 and to the output terminal OUT of storage element 111D, and a control terminal of multiplexer 118D-1 is coupled to receive control signal upf_corrupt_retain. As in sequential block 110C (FIG. 6B), control signal upf_generic_save is applied directly to set/reset terminal S/R of retention cell 112D.

Figure 8:
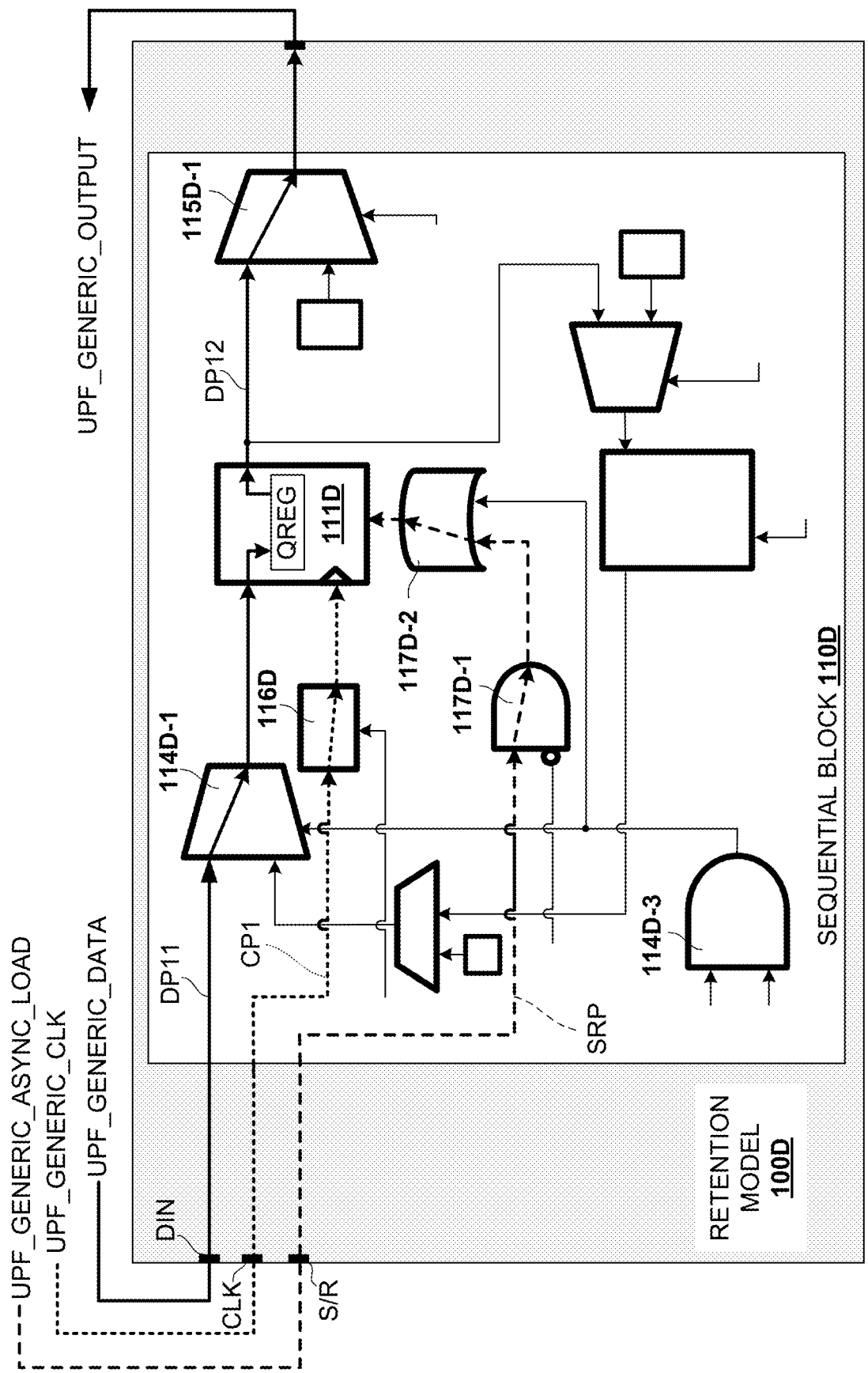
FIG. 8 is a block diagram depicting the sequential block of FIG. 7 in a default operating mode.

FIG. 8 depicts sequential block 110D during RTL simulation when all control signals are de-asserted, whereby the signal routing circuit of sequential block 110D enters a default state that provides first data signal path DP11 between the input terminal IN of the storage element 111D and data input node DIN of retention model 100D, provides second data signal path DP12 between the output terminal of the storage element 111D and data output node DOUT of retention model 100D, provides clock signal path CP1 between a clock terminal>of storage element 111D and clock node CLK of the retention model 100D, and provides set/reset signal path SRP between a set/reset terminal S/R of storage element 111D and set/reset node S/R of the retention model 100D. In this example, first data signal path DP11 facilitates transmission of generic data signal UPF_GENERIC_DATA from upstream circuitry to the input terminal IN of the storage element 111D by way of multiplexer 114D-1, the transmission of generic clock signal UPF_GENERIC_CLK to the clock terminal of storage element 111D by way of clock gater 116D, the transmission of generic set/reset signal UPF_GENERIC_ASYNC_LOAD to the set/reset terminal of storage element 111D by way of logic AND gate 117D-1 and logic OR gate 117D-2, and the transmission of generic data output signal UPF_GENERIC_OUTPUT from the output terminal of storage element 111D to downstream circuitry by way of multiplexer 115D-1.

Technology Specific EDA System/Workflow Explanation

Figure 9:
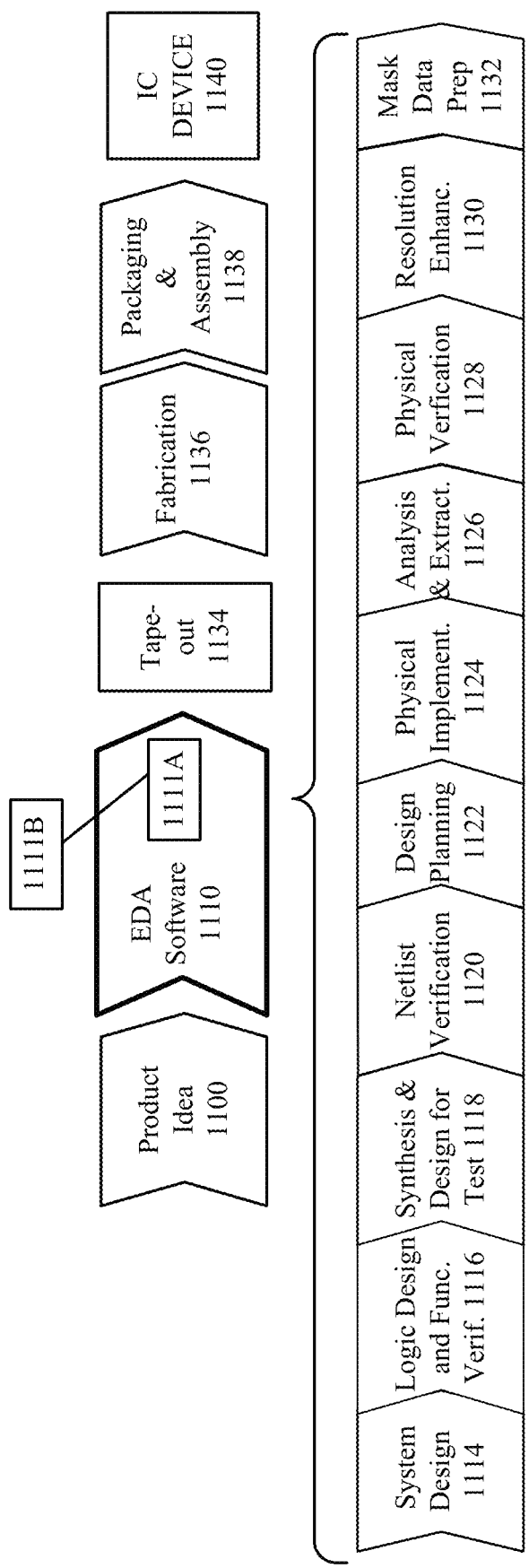
FIG. 9 is a flowchart illustrating various operations in the design and fabrication of an integrated circuit in accordance with an embodiment of the present disclosure.

FIG. 9 illustrates various processes performed in the design and fabrication of IC devices using EDA software tools with a computer to transform data and instructions that represent the associated IC devices. These processes start with the generation of a product idea (1100) with information supplied by one or more circuit designers. The product idea is realized as the evolving circuit design during the circuit design process performed by the circuit designer(s) using EDA software tools (1110). One or more steps of the EDA software design process performed by EDA software tools (1110) is implemented using a computer-readable medium 1111A that is read by a computer 1111B. EDA software tools may also be signified herein using the singular "EDA software tool", as EDA software, or as a design tool. When a circuit design is finalized, it is typically taped-out (1134), and then multiple ICs, each being a physical implementation of the final circuit design, are fabricated on a semiconductor wafer (160) using a selected technology node. The semiconductor wafer is then diced into individual chips, with each chip including one of the ICs, and then the chips are packaged and assembled using corresponding processes (1138), resulting in finished IC device 1140.

Note that the design process that uses EDA software tools (1110) includes operations 1114-1132, which are described below. This design flow description is for illustration purposes only and is not meant to limit the present disclosure. For example, an actual circuit design may require a circuit designer to perform the design operations in a different sequence than the sequence described herein.

During system design (1114), a circuit designer describes the functionality to be performed by the manufactured IC device. The designer can also perform what-if planning to refine the functionality and to check costs. Note that hardware-software architecture partitioning can occur at this stage. Exemplary EDA software products from Synopsys, Inc. of Mountain View, Calif. that can be used at this stage include: Model Architect, Saber, System Studio, and Designware products. Cells or other descriptions including all relevant information pertaining to the two-part USB PHY configuration of the present invention are typically copied from a library accessible by way of the EDA software tool, and inserted into a circuit design during the system design process.

Then, during logic design and functional verification (1116), VHDL or Verilog code for modules in the circuit is written and the design is checked for functional accuracy. More specifically, the design is checked to ensure that it produces the correct outputs. The VHDL or Verilog code is software comprising optimized readable program instructions adapted for the efficient description of a logic design. Exemplary EDA software products from Synopsys, Inc. of Mountain View, Calif. that can be used at this stage include: VCS, Vera, Designware, Magellan, Formality, ESP and Leda products. In one embodiment, the retention models described herein are entered into a circuit design and modified using the methods described herein during logical design and functional verification.

Next, during synthesis and design for test (1118), VHDL/Verilog code may be translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler, Physical Compiler, Test Compiler, Power Compiler, FPGA Compiler, Tetramax, and Designware products.

Moreover, during netlist verification (1120), the netlist is checked for compliance with timing constraints and for correspondence with the VHDL/Verilog code. Exemplary EDA software products from Synopsys, Inc. of Mountain View, Calif. that can be used at this stage include: Formality, Primetime, and VCS products. In one embodiment, the RTL and UPF simulation tools/methods and logical equivalence checking described herein are performed during netlist verification.

Furthermore, during design planning (1122), an overall floor plan for the integrated circuit is constructed and analyzed for timing and top-level routing. Exemplary EDA software products from Synopsys, Inc. of Mountain View, Calif. that can be used at this stage include: Astro and IC Compiler products.

Additionally, during physical implementation (1124), the placement (positioning of circuit elements such as transistors or capacitors) and routing (connection of the same by a plurality of conductors) occurs. Exemplary EDA software products from Synopsys, Inc. of Mountain View, Calif. that can be used at this stage include: the Astro and IC Compiler products.

Then, during analysis and extraction (1126), the circuit function is verified at a transistor level, which permits refinement of the logic design. Exemplary EDA software products from Synopsys, Inc. of Mountain View, Calif. that can be used at this stage include: Astrorail, Primerail, Primetime, and Star RC/XT products.

Next, during physical verification (1128), the design is checked to ensure correctness for manufacturing issues, electrical issues, lithographic issues, and circuitry. Exemplary EDA software products from Synopsys, Inc. of Mountain View, Calif. that can be used at this stage include the Hercules product.

Moreover, during resolution enhancement (1130), geometric manipulations of the layout are performed to improve manufacturability of the design. Exemplary EDA software products from Synopsys, Inc. of Mountain View, Calif. that can be used at this stage include: Proteus, Proteus, and PSMGED products.

Additionally, during mask-data preparation (1132), the 'tape-out' data for production of masks to produce finished integrated circuits is provided. Exemplary EDA software products from Synopsys, Inc. of Mountain View, Calif. that can be used at this stage include the Cats. family of products.

For all of the above-mentioned integrated circuit design tools, similar tools from other EDA vendors, such as Cadence and Mentor Graphics can be used as an alternative. Additionally, similarly non-commercial tools available from universities can be used.

Embodiments of the present disclosure can be used during one or more of the above-described stages. Specifically, some embodiments of the present disclosure can be used in EDA software 1110.

A storage subsystem is preferably used to store the basic programming and data constructs that provide the functionality of some or all of the EDA tools described herein, and tools applied for development of cells for the library and for physical and logical design using the library. These software modules are generally executed by one or more processors in a manner known to those of ordinary skill in the art.

Hardware/Software Equivalence

Certain innovations, embodiments and/or examples described herein comprise and/or use a processor. As used herein, the term "processor" signifies a tangible information processing device that physically transforms information, for example, data. As defined herein, "data" signifies information that can be in the form of an electrical, magnetic, or optical signal that is capable of being stored, accessed, transferred, combined, compared, or otherwise manipulated by an information processing device.

The processor can be electronic, for example, comprising digital logic circuitry (for example, binary logic), or analog (for example, an operational amplifier). The processor can also be non-electronic, for example, as seen in processors based on optical signal processing, DNA transformations or quantum mechanics, or a combination of technologies, such as an optoelectronic processor. For information structured in binary form, any processor that can transform the information using the AND, OR and NOT logical operations (and their derivatives, such as the NAND, NOR, and XOR operations) can transform the information using any function of Boolean logic. A processor such as a neural network processor can also transform information non-digitally. There is no scientific evidence that any of these processors are processing, storing and retrieving information, in any manner or form equivalent to the bioelectric circuitry of the human brain.

As used herein, the term "module" signifies a tangible information processing device that typically is limited in size and/or complexity. For example, one or more methods or procedures in a computer program can be referred to as a module. A module can also refer to a small network of digital logic devices, in which the logic devices often may be interconnected to form a network. In many cases, methods and procedures in a computer program written in a specialized language, such as System C, can be used to generate a network of digital logic devices that process information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs—for example, sold by Xilink or Altera), Random Access Memories (RAMs) or microprocessors. A module is configured to process information, typically using a sequence of operations to transform the information (or in the case of ROMs and RAMS, transforming information by using the input information as an address for memory that stores output information), to perform aspects of the present innovations, embodiments and/or examples of the invention.

Modules that are temporarily configured need not be configured at any one instance in time. For example, an information processor comprising one or more modules can have the modules configured at different times. The processor can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific design goals. The "substance" of a module's processing is independent of the form in which it is manufactured or implemented.

As used herein, the term "algorithm" signifies a sequence or set of operations or instructions that a module can use to transform information to achieve a result. A module can comprise one or more algorithms. As used herein, the term "computer" includes an information processor that can perform certain operations such as (but not limited to) the AND, OR and NOT logical operations, with the addition of memory (for example, memory based on flip-flops using the NOT-AND or NOT-OR operation). Such a digital computer is said to be Turing-complete or computationally universal. A computer, whether or not it is a digital computer, typically comprises many modules.

As used herein, the term "software" or "program" signifies one or more algorithms and data structures that configure an information processing device for use in the innovations, embodiments and examples described in this specification. Such devices configurable by software include one or more computers, for example, standalone, client or server computers, or one or more hardware modules, or systems of one or more such computers or modules. As used herein, the term "software application" signifies a set of instruction and data that configure the information processing device to achieve a specific result, for example, to perform word processing operations, or to encrypt a set of data.

As used herein, the term "programming language" signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object oriented programming language such as Smalltalk, C++ or the like, and any future equivalent programming languages.

Software is entered into, equivalently, read into, one or memories of the computer or computer system from an information storage device. The computer typically has a device for reading storage media that is used to transport the software, or has an interface device that receives the software over a network.

Technology Specific General Computer Explanation

Figure 10:
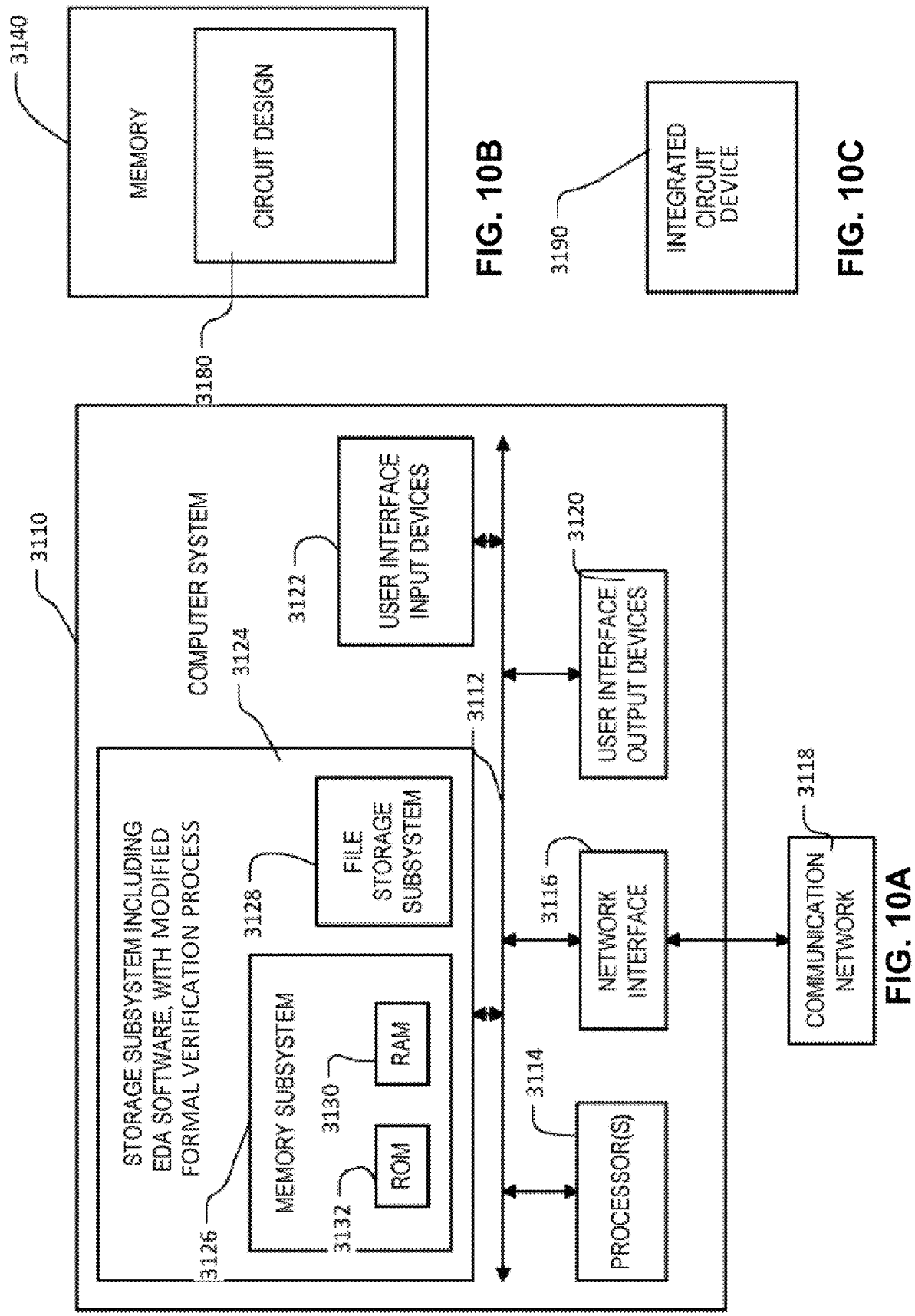
FIGS. 10A, 10B and 10C are simplified block diagrams of a computer system suitable for use with embodiments of the present invention, as well as circuit design and circuit embodiments of the technology associated with the present invention.
Figure 11:
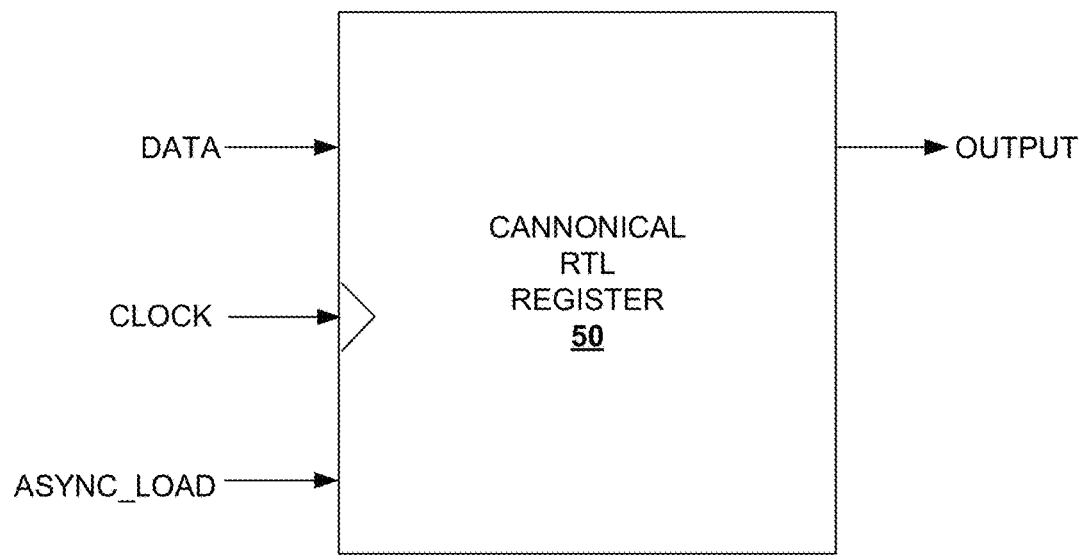
FIG. 11 is a block diagram depicting a conventional canonical RTL register.
Figure 12:
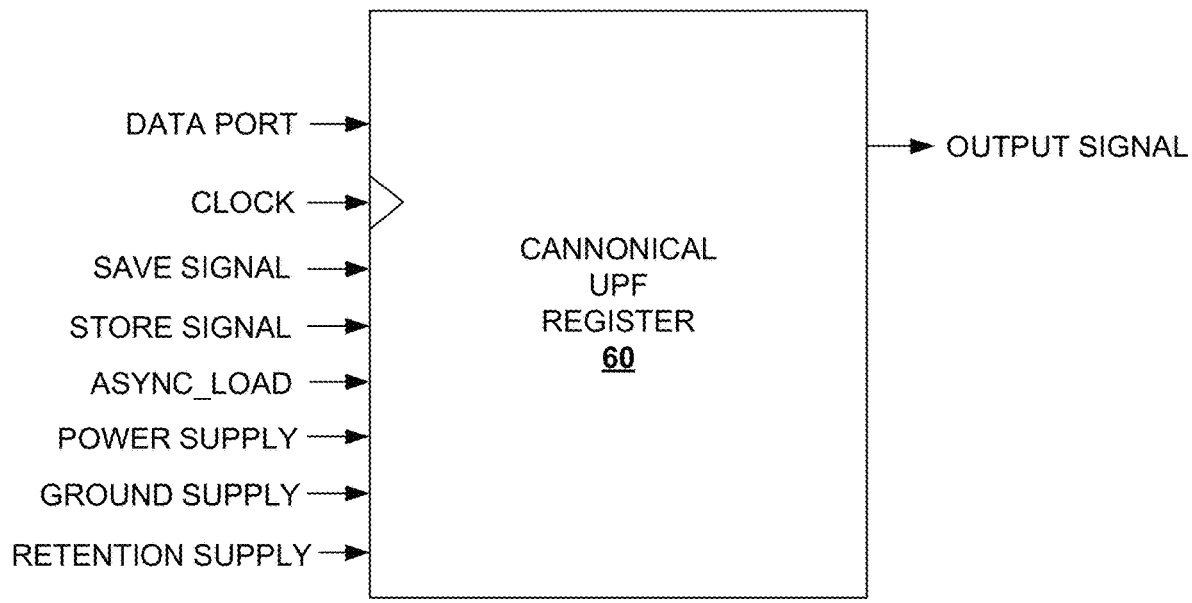
FIG. 12 is a block diagram depicting a conventional canonical UPF register.

FIGS. 10A, 10B and 10C are simplified block diagrams of a computer system suitable for generating and verifying circuit designs using the multi-dimensional constraint solver of the present invention. Computer system 3110 typically includes at least one computer or processor 3114 which communicates with a number of peripheral devices via bus subsystem 3112. These peripheral devices may include a storage subsystem 3124, comprising a memory subsystem 3126 and a file storage subsystem 3128, user interface input devices 3122, user interface output devices 3120, and a network interface subsystem 3116. The input and output devices allow user interaction with computer system 3110.

The computer system may be a server computer, a client computer, a workstation, a mainframe, a personal computer (PC), a tablet PC, a set-top box (STB), a personal digital assistant (PDA), a cellular telephone, a smartphone, a web appliance, a television, a network router, switch or bridge, or any data processing machine capable of executing instructions (sequential or otherwise) that specify actions to be taken by that machine. Innovations, embodiments and/or examples of the claimed inventions are neither limited to conventional computer applications nor the programmable apparatus that run them. To illustrate, the innovations, embodiments and/or examples of the claimed inventions can include an optical computer, quantum computer, analog computer, or the like. Aspects of the present invention are well suited to multi processor or multi-core systems and may use or be implemented in distributed or remote systems. Processor here is used in the broadest sense to include singular processors and multi-core or multi processor arrays, including graphic processing units, digital signal processors, digital processors and combinations of these elements. Further, while only a single computer system or a single machine may be illustrated, the use of a singular form of such terms shall also signify any collection of computer systems or machines that individually or jointly execute instructions to perform any one or more of the sets of instructions discussed herein. Due to the ever-changing nature of computers and networks, the description of computer system 3110 depicted in FIG. 10A is intended only as a specific example for purposes of illustrating the preferred embodiments. Many other configurations of computer system 3110 are possible having more or less components than the computer system depicted in FIG. 10A.

Network interface subsystem 3116 provides an interface to outside networks, including an interface to communication network 3118, and is coupled via communication network 3118 to corresponding interface devices in other computer systems or machines. Communication network 3118 may comprise many interconnected computer systems, machines and communication links. These communication links may be wireline links, optical links, wireless links, or any other devices for communication of information. Communication network 3118 can be any suitable computer network, for example the Internet.

User interface input devices 3122 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 3110 or onto communication network 3118. User interface output devices 3120 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide nonvisual display such as via audio output devices. In general, use of the term "output device" is intended to include all possible types of devices and ways to output information from computer system 3110 to the user or to another machine or computer system.

Memory subsystem 3126 typically includes a number of memories including a main random access memory (RAM) 3130 for storage of instructions and data during program execution and a read only memory (ROM) 3132 in which fixed instructions are stored. In one embodiment, RAM 3130 also serves to store the various tools, libraries and other data utilized during incorporation of retention models into circuit designs using the methods described herein. File storage subsystem 3128 provides persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystem 3128. Bus subsystem 3112 provides a device for letting the various components and subsystems of computer system 3110 communicate with each other as intended. Although bus subsystem 3112 is shown schematically as a single bus, alternative embodiments of the bus subsystem may use multiple busses.

When configured to execute an EDA software tool including the RTL and UPF simulation tools described herein, computer system 3110 depicted in FIG. 10A represents an electronic structure suitable for creating a circuit design that includes the retention models described herein. FIG. 10B shows a memory 3140 such as a non-transitory, computer readable data storage medium associated with file storage subsystem 3128, and/or with network interface subsystem 3116, and includes a data structure 3180 specifying a circuit design describing an integrated circuit. The memory 3140 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light). FIG. 10C is a block representing an IC 3190 designed and fabricated in accordance with the processes described above, where circuit 3190 is fabricated in accordance with the circuit design of data structure 3180 (see FIG. 10B).

The foregoing Detailed Description signifies in isolation individual features, structures or characteristics described herein and any combination of two or more such features, structures or characteristics, to the extent that such features, structures or characteristics or combinations thereof are based on the present specification as a whole in light of the knowledge of a person skilled in the art, irrespective of whether such features, structures or characteristics, or combinations thereof solve any problems disclosed herein, and without limitation to the scope of the claims. When an embodiment of a claimed invention comprises a particular feature, structure, or characteristic, it is within the knowledge of a person skilled in the art to use such feature, structure, or characteristic in connection with other embodiments whether or not explicitly described.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein were chosen and described to signify the principles of the invention and its useful application, thereby enabling others skilled in the art to understand how various embodiments and variations are suited to the particular uses signified.

The foregoing Detailed Description of innovations, embodiments, and/or examples of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

What is claimed is:

1. A non-transitory computer readable medium comprising stored instructions, the stored instructions when executed by a processor, cause the processor to execute operations including:
   model, by a retention model, a state retention cell in a circuit design, the retention model including a data input node, a clock node and a set/reset node configured to receive corresponding generic input signals from upstream circuitry of said circuit design, and a data output node configured to pass a generic output signal to downstream circuitry of said circuit design, the retention model comprising:
   a sequential block including:
      a storage element configured to store a first data value,
      a retention element configured to store a second data value, and
      a signal routing circuit operably coupled to the storage element, the retention element, the input node, the clock node, the set/reset node and the data output node; and
   a retention controller block including a signal path control circuit configured to assert one or more signal path control signals in response to one or more external retention control signals,
   wherein the signal routing circuit is configured to enter a default operating mode when said retention controller block de-asserts all of said signal path control signals such that said signal routing circuit forms a first data signal path between the input terminal of the storage element and the data input node of the retention model, forms a second data signal path between the output terminal of the storage element and the data output node of the retention model, forms a clock signal path between a clock terminal of the storage element and the clock node of the retention model, and forms a set/reset signal path between a set/reset terminal of the storage element and the set/reset node of the retention model, whereby said storage element is operably configured to implement one of a flip-flop and a latch when said signal routing circuit is in said default operating mode.

2. The non-transitory computer readable medium of claim 1,
   wherein the retention model is implemented in said circuit design using a always block command and a map_retention_cell command,
   wherein when the circuit design is simulated by an RTL simulator, RTL operations of the retention model are entirely simulated using the always block command, and
   wherein when the circuit design is simulated by a UPF simulator, UPF operations of the retention model are simulated using the map_retention_cell command.

3. The non-transitory computer readable medium of claim 1, wherein the retention model is configured such that the data input node and the data output node are coupled to the sequential block, and the retention model comprises one or more first restrictions that prevent coupling the data input node and the data output node to the retention controller block.

4. The non-transitory computer readable medium of claim 1, wherein the signal routing circuit comprises:
   a data-in path circuit configured to provide said first data signal path between the generic input node and said data input terminal of the storage element when a first signal path control signal is de-asserted;
   a data-out path circuit configured to provide said second data signal path between the generic output node and the data output terminal of the storage element when a second signal path control signal is de-asserted;
   a clock path circuit configured to provide said clock signal path between the generic clock node and the clock terminal of the storage element when a third signal path control signal is de-asserted; and
   a set/reset path circuit configured to provide said set/reset signal path between said set/reset terminal of the storage element and said set/reset input node when a fourth signal path control signal is de-asserted.

5. The non-transitory computer readable medium of claim 4, wherein the retention model further comprises:
one or more second restrictions that prevent modification of the data-in path circuit, said data-out path circuit, said clock path circuit and said set/reset path circuit, and
one or more third restrictions that prevent modification of the first signal path control signal, the second signal path control signal, the third signal path control signal and the fourth signal path control signal.

6. The non-transitory computer readable medium of claim 5,
wherein the one or more signal path control signals form a sequential-block/controller-block interface, and
wherein the retention model further comprises one or more third restrictions that prevent modification of the sequential-block/controller-block interface.

7. The non-transitory computer readable medium of claim 1, wherein the retention model further comprises one or more second restrictions that prevent modification of the signal routing circuit.

8. The non-transitory computer readable medium of claim 1, wherein the signal routing circuit comprises a data-out path circuit configured to provide said second data signal path between the generic output node and the data output terminal of the storage element when a second signal path control signal is de-asserted, and to provide a third signal path between a second output node and one of said data output terminal of said storage element and a data output terminal of said retention element when said second signal path control signal is asserted.

9. The non-transitory computer readable medium of claim 1, wherein the signal routing circuit comprises a plurality of path circuits configured to provide said first data signal path, said second data signal path, said clock signal path and said set/reset signal path when said retention controller block de-asserts all of said signal path control signals, and
wherein the signal routing circuit is configured such that at least one of said signal path control signals is operably coupled to at least two path circuits of said plurality of path circuits.

10. The non-transitory computer readable medium of claim 1, wherein the signal routing circuit comprises a plurality of circuit elements that are operably configured to provide said first data signal path, said second data signal path, said clock signal path and said set/reset signal path when said retention controller block de-asserts all of said signal path control signals.

11. A computer-implemented method for incorporating a state retention cell between upstream circuitry and downstream circuitry of a circuit design, the method including
instantiating a retention model into the circuit design such that a data input node of said retention model is configured to receive a generic input data signal from said upstream circuitry, such that a data output node of said retention model is configured to pass a generic output signal to downstream circuitry, and such that a clock node and a set/reset node are operably coupled to respectively receive generic clock and set/reset signals from corresponding circuitry of said circuit design,
wherein the retention model comprises:
a sequential block including
a storage element configured to store a first data value,
a retention element configured to store a second data value, and
a signal routing circuit operably coupled to the storage element, the retention element, the input node, the clock node, the set/reset node and the data output node; and
a retention controller block including a signal path control circuit configured to assert one or more signal path control signals in response to one or more external retention control signals, and
wherein the signal routing circuit is configured to enter a default operating mode when said retention controller block de-asserts all of said signal path control signals such that said signal routing circuit forms a first data signal path between the input terminal of the storage element and the data input node of the retention model, forms a second data signal path between the output terminal of the storage element and the data output node of the retention model, forms a clock signal path between a clock terminal of the storage element and the clock node of the retention model, and forms a set/reset signal path between a set/reset terminal of the storage element and the set/reset node of the retention model, whereby said storage element is operably configured to implement one of a flip-flop and a latch when said signal routing circuit is in said default operating mode.

12. The method of claim 11,
wherein the retention model is implemented in said circuit design using a always block command and a map_retention_cell command, and
wherein the method further comprises:
using an RTL simulator to simulate an RTL description of said circuit design using the always block command, and
using a UPF simulator to simulate a UPF description of the circuit design using the map_retention_cell command, and
utilizing a logical equivalence checking (LEC) tool to determine a functional equivalency of the RTL description and the UPF description.

13. The method of claim 11, further comprising modifying the retention controller block such that, when said signal path control circuit asserts said one or more signal path control signals, said signal routing circuit generates signal paths according to a selected retention strategy.

14. The method of claim 13,
wherein the signal routing circuit comprises a data-out path circuit configured to provide said second data signal path between the generic output node and the data output terminal of the storage element when a second signal path control signal is de-asserted, and to provide a third signal path between a second output node and one of said data output terminal of said storage element and a data output terminal of said retention element when said second signal path control signal is asserted, and
wherein said modifying the retention controller block comprises modifying a portion of said retention controller block to assert said second signal path control signal when said retention model is implemented in one of a balloon retention strategy and a master/slave-alive retention strategy.

15. A system for incorporating a state retention cell between upstream circuitry and downstream circuitry of a circuit design, comprising:
a storage device to store a retention model;
a processing device to instantiate the retention model into the circuit design such that a data input node of said retention model is configured to receive a generic input data signal from said upstream circuitry, such that a data output node of said retention model is configured to pass a generic output signal to downstream circuitry, and such that a clock node and a set/reset node are operably coupled to respectively receive generic clock and set/reset signals from corresponding circuitry of said circuit design, wherein the retention model includes:

a sequential block including
- a storage element configured to store a first data value,
- a retention element configured to store a second data value, and
- a signal routing circuit operably coupled to the storage element, the retention element, the input node, the clock node, the set/reset node and the data output node; and a retention controller device including a signal path control circuit configured to assert one or more signal path control signals in response to one or more external retention control signals, and wherein the signal routing circuit is configured to enter a default operating mode when said retention controller device de-asserts all of said signal path control signals such that said signal routing circuit forms a first data signal path between the input terminal of the storage element and the data input node of the retention model, forms a second data signal path between the output terminal of the storage element and the data output node of the retention model, forms a clock signal path between a clock terminal of the storage element and the clock node of the retention model, and forms a set/reset signal path between a set/reset terminal of the storage element and the set/reset node of the retention model, whereby said storage element is operably configured to implement one of a flip-flop and a latch when said signal routing circuit is in said default operating mode.

16. The system of claim 15, wherein the retention model is implemented in said circuit design using a always block command and a map_retention_cell command, and wherein the system further comprises:

an RTL simulator configured to simulate an RTL description of said circuit design using the always block command, and a UPF simulator configured to simulate a UPF description of the circuit design using the map_retention_cell command, and a logical equivalence checking (LEC) tool configured to determine a functional equivalency of the RTL description and the UPF description.

17. The system of claim 15, further comprising an Electronic Design Automation (EDA) development tool configured to facilitate modification of the retention controller block such that, when said signal path control circuit asserts said one or more signal path control signals, said signal routing circuit generates signal paths according to a selected retention strategy.

* * * * *